US006863241B2

(12) United States Patent
Sash

(10) Patent No.: US 6,863,241 B2
(45) Date of Patent: Mar. 8, 2005

(54) CONTROL OF AN AIRCRAFT AS A THRUST-VECTORED PENDULUM IN VERTICAL, HORIZONTAL AND ALL FLIGHT TRANSITIONAL MODES THEREOF

(76) Inventor: Thomas Sash, 1508 Paddock Dr., Plant City, FL (US) 33566

( * ) Notice: Subject to any disclaimer, the term of this patent is extended or adjusted under 35 U.S.C. 154(b) by 0 days.

(21) Appl. No.: 10/458,737

(22) Filed: Jun. 11, 2003

(65) Prior Publication Data

US 2004/0075017 A1 Apr. 22, 2004

Related U.S. Application Data

(60) Provisional application No. 60/388,435, filed on Jun. 12, 2002.

(51) Int. Cl.[7] .............................................. B64C 27/52
(52) U.S. Cl. .................... 244/17.25; 244/7 R; 244/12.4
(58) Field of Search ............................ 244/17.25, 12.4, 244/6, 7 R, 7 A

(56) References Cited

U.S. PATENT DOCUMENTS

| | | | |
|---|---|---|---|
| 2,448,392 A | * | 8/1948 | Quady et al. ................ 244/7 R |
| 2,629,570 A | * | 2/1953 | Carnahan ..................... 244/7 R |
| 3,118,504 A | * | 1/1964 | Cresap ........................... 416/1 |
| 3,166,271 A | * | 1/1965 | Zuck .............................. 244/7 C |
| 3,430,894 A | * | 3/1969 | Levinsky et al. ............ 244/7 C |
| 3,934,843 A | | 1/1976 | Black |
| 4,059,247 A | * | 11/1977 | Prewitt ......................... 244/7 R |
| 4,730,795 A | | 3/1988 | David |
| 5,098,033 A | | 3/1992 | Haseloh et al. |
| 5,758,844 A | | 6/1998 | Cummings |
| 5,863,013 A | * | 1/1999 | Schmittle ....................... 244/48 |
| RE36,487 E | | 1/2000 | Wainfan |
| 6,086,016 A | | 7/2000 | Meek |
| 6,293,492 B1 | | 9/2001 | Yanagisawa |
| 6,343,768 B1 | | 2/2002 | Muldoon |
| 6,382,556 B1 | | 5/2002 | Pham |
| 2002/0100834 A1 | * | 8/2002 | Baldwin ..................... 244/12.4 |

* cited by examiner

Primary Examiner—Michael J. Carone
Assistant Examiner—Gabriel S. Sukman
(74) Attorney, Agent, or Firm—Lowe Hauptman Gilman & Berner, LLP

(57) ABSTRACT

An improved aircraft includes a thrust source, a wing, and a boom functioning as a "free lever" and having a distal end upon which the thrust is acting and a proximal end about which the boom is freely rotatable to balance forces acting on the proximal and distal ends of the boom. The proximal end is pivotably mounted at or below the center of lift of the wing and above the center of mass of the aircraft. The distal end is located above the center of mass of the aircraft, when the lever is in the vertical position to establish a gravity pendulum, and forward of the center of drag of the aircraft, when the lever is in the horizontal position, to establish a drag pendulum. All transition flight is a resolution of the force vectors of the two pendulums. A director adjusts the vertical and horizontal thrust components of the propulsion system.

47 Claims, 17 Drawing Sheets

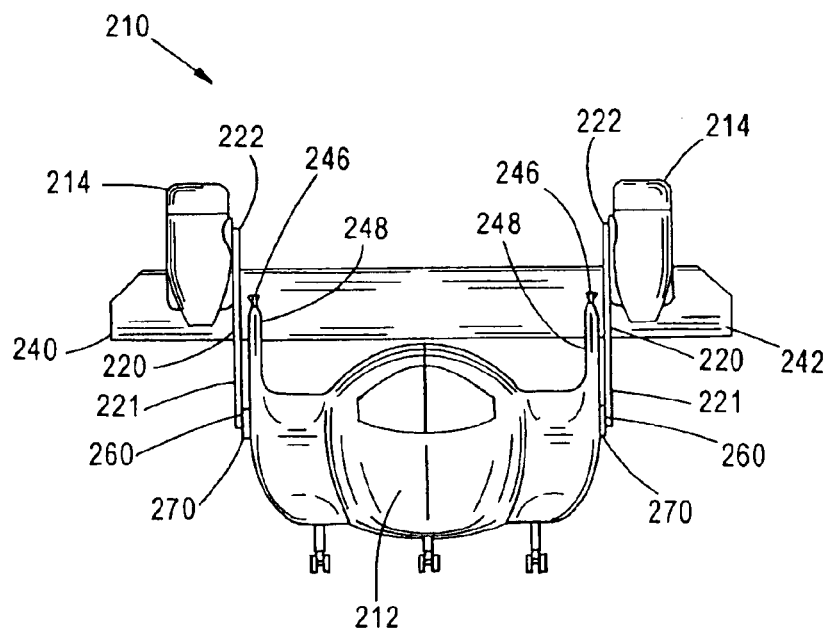
FIG. 17
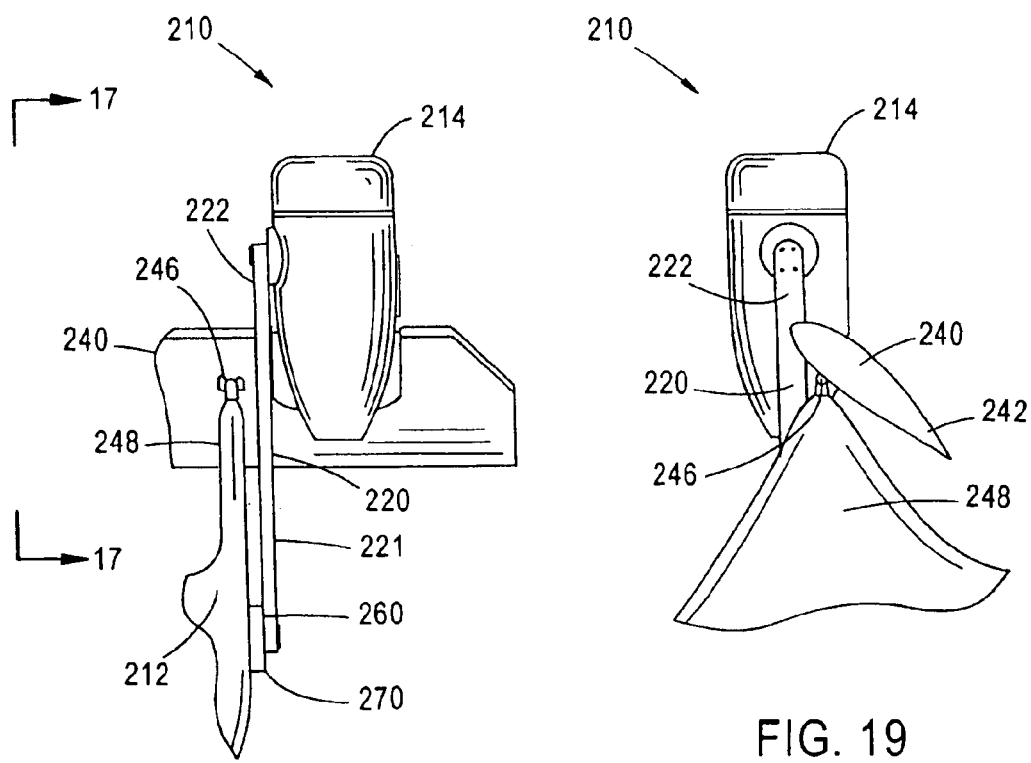
FIG. 18
FIG. 19

CONTROL OF AN AIRCRAFT AS A THRUST-VECTORED PENDULUM IN VERTICAL, HORIZONTAL AND ALL FLIGHT TRANSITIONAL MODES THEREOF

CROSS REFERENCE

This application claims priority from Provisional Application No. 60/388,435 filed Jun. 12, 2002, which is incorporated herein by reference in its entirety.

FIELD OF THE INVENTION

This invention relates to aircraft and more particularly to an improved aircraft incorporating the benefits of a vertical takeoff and landing aircraft, e.g., a rotary wing aircraft, and an airplane, e.g., a fixed wing or a flexible wing aircraft, and to an improved aircraft control method providing for inherently stable flight in both vertical and horizontal flight, and all transition modes thereof.

BACKGROUND ART

Throughout the twentieth century, the prior art has developed for various types of aircraft. In general, the aircraft can be divided into two basic types of aircraft. The first type of aircraft is commonly referred to as a fixed wing aircraft whereas the second type of aircraft is commonly referred to as a rotary wing aircraft.

In fixed wing aircraft, an engine may transmit output to a horizontally extending shaft for rotating a propeller to provide the horizontal thrust to the fixed wing aircraft. In the alternative, the engine may be a jet engine providing horizontal thrust to the fixed wing aircraft by the discharge of hot gases.

A traditional fixed wing airplane must have a forward center of mass. If it did not, and the airplane wings entered a stalled condition, there would be no means of lowering the nose of the aircraft to regain flying speed and therefore the aircraft would be inherently unstable. The design physics for airplanes require a center of mass forward of the center of lift acting in a fulcrum arrangement to provide inherent flight stability so long as the aircraft is in flight mode. This fulcrum arrangement provides downward pressure from the tail of the aircraft in flight which counterbalances the static forward center of mass. A fixed wing aircraft is inherently unstable below the stall speed of the particular aircraft. The fixed wing aircraft utilizes displaceable flight surfaces, the aircraft reacting to forces generated from the airflow over the control surfaces during forward flight to achieve control of the aircraft. Flaps, elevators, rudders, ailerons, and stabilators are all examples of these types of flight controls.

In a rotary wing aircraft, the rotary wing aircraft includes an engine having a vertically extending shaft for rotating a rotor to provide a vertical thrust to the rotary wing aircraft. As the rotor rotates about the vertically extending shaft, the rotor provides a vertical lift to the rotary wing aircraft. The rotary wing aircraft must have a pendulum center of mass. The rotary wing aircraft is stable at zero forward airspeed because the center of mass of the aircraft is suspended as a pendulum below the center of lift of the rotating rotor. The rotary wing aircraft relies on vectored thrust instead of flight controls to achieve control of the aircraft. Collective pitch, differential rotor blade thrust, and cyclic pitch are all examples of these types of vectored thrust flight controls. Elevators, ailerons are not utilized. The rotary wing pilot is able to alter the thrust of the rotor longitudinally, laterally, and vertically, to determine the flight path desired.

Each of the rotary wing aircraft and the fixed wing aircraft has certain advantages and disadvantages. The rotary wing aircraft has the advantage of vertical takeoff and landing and hovering maneuvers due to the vertical thrust from a rotating rotor. Compared with a fixed wing aircraft, the rotary wing aircraft has the disadvantage of inefficient cross country travel, the inability for high speed horizontal flight, and lower operational altitudes.

Compared with the rotary wing aircraft, the fixed wing aircraft has the advantage of being able to travel more efficiently at high speeds and fly at high altitudes. The fixed wing aircraft has the disadvantage of substantial takeoff and landing speed thus requiring a substantial runway space for takeoff and landings. In addition, the fixed wing aircraft is incapable of flight below operating airspeeds or hovering maneuvers due to the loss of lift over the fixed wing of the aircraft due to insufficient speed.

Those attempts which have tried to create a heliplane, or some similar conversion of a helicopter into an airplane by attaching a wing to the vehicle, have been quite unsuccessful. The spinning rotor creates enormous drag at high forward speeds, and one still has all the problems with the forward and rearward sweeping rotor blades and the problem that the center of mass remains inherently different from an airplane.

Examples of known "heliplanes" are U.S. Pat. Nos. 3,934,843, 4,730,795, 6,086,016, 5,758,844, and 6,343,768, which are incorporated by reference herein in their entireties.

All of the previous art has failed to address the fundamental difference in the center of mass, both dynamic and static, between existing vertical flight aircraft (helicopters) and existing horizontal flight aircraft (airplanes).

All of the previous art has failed to address the fundamental difference in efficiency between the forward movement of vertical flight aircraft (helicopters) and the forward movement of existing horizontal flight aircraft (airplanes).

Conversely, all of the previous art has failed to address the fundamental difference in efficiency between the vertical movement of vertical flight aircraft (helicopters) and the vertical movement of existing horizontal flight aircraft (airplanes).

Although many of the United States patents referenced in this application, and other patents of which I am aware, have attempted to provide a hybrid aircraft that has the advantages of a fixed wing aircraft and a rotary wing aircraft, the aforementioned United States patents fail to accomplish this task. None has been a commercial success. One fundamental reason why the hybrid aircrafts of prior art have failed to accomplish this task is due to a period of instability encountered during the period of transition between the operation as a fixed wing aircraft and the operation as a rotary wing aircraft. During this period of transition, the center of mass of the hybrid aircraft moves between the operation as a rotary wing aircraft and the operation as a fixed wing aircraft, and vice versa. The movement of the center of mass of the hybrid aircraft creates a fundamental instability in the operation of the hybrid aircraft making the hybrid aircraft difficult to control during this transition period. This will be best explained with reference to FIGS. 1 and 2.

FIG. 1 is a side view of a conventional rotary wing aircraft 10R comprising a fuselage 12R and an engine 14R. The engine 14R is coupled through a vertical shaft 20R for rotating a rotor 30R to provide vertical lift to the rotary wing aircraft 10R. A tail section 50R is rigidly secured to the fuselage 12R having a tail rotor 56R. The tail rotor 56R has the same function as the rudder 56F in the conventional fixed wing aircraft 10F of FIG. 2.

The rotor 30R of the rotary wing aircraft 10R provides a center of lift (CL) for rotary wing aircraft 10R. The center of mass (CM) is underslung as a pendulum below of the center of lift (CL) of the rotary wing aircraft 10R. Since the rotor 30R provides a center of lift (CL) directly above the center of mass (CM) of the rotary wing aircraft 10R, the rotary wing aircraft 10R can operate as a gravity stabilized pendulum in a hovering mode with zero horizontal speed. Control of the rotary wing aircraft is obtained by vectoring the thrust of the rotor. When the thrust produced by rotor 30R is vectored in a rearward direction, a component of the once vertical thrust of the rotating rotor 30R then provides a horizontal thrust component to propel the rotary wing aircraft 10R in a forward direction, opposite to the vectored thrust.

As the thrust produced by the rotor 30R is angled further in the rearward direction to induce forward motion, the component of the rotating rotor 30R providing lift for the rotary wing aircraft 10R decreases in accordance with the cosine of the angle of said thrust in the rearward direction. This is a fundamental limitation of a rotary wing aircraft 10R.

FIG. 2 is a side view of a conventional fixed wing aircraft 10F comprising a fuselage 12F and an engine 14F. The engine 14F is coupled through a horizontal shaft 20F for rotating a propeller 30F to provide forward motion to the fixed wing aircraft 10F. The fixed wing aircraft 10F includes a fixed wing 40F rigidly secured to the fuselage 12F of the fixed wing aircraft 10F. Typically, the fixed wing 40F includes plural ailerons 42F and plural flaps 44F. A tail section 50F is rigidly secured to the fuselage 12F and has a horizontal stabilizer 54F and a vertical stabilizer 52F. The horizontal stabilizer 54F includes plural elevators 58F whereas the vertical stabilizer 52F includes a rudder 56F.

The fixed wing 40F of the fixed wing aircraft 10F provides a center of lift (CL) for fixed wing aircraft 10F. The center of mass (CM) of the fixed wing aircraft 10F is located forward of the center of lift (CL) of fixed wing aircraft 10F. The center of mass (CM) being located forward of the center of lift (CL), i.e., a forward center of mass, is necessary to achieve dynamic stability in flight and is required to regain control of the fixed wing aircraft 10F in the event of a stall condition.

A stall condition exists when the angle of attack of the fixed wing of aircraft 10F exceeds the critical angle needed to maintain airflow to the upper surface of the wing. The airflow then separates from the upper surface of the wing, thereby destroying lift and control of the aircraft. Since the fixed wing aircraft 10F has a forward center of mass, the loss of lift in the stall condition lowers the angle of attack of the wing, thus reestablishing attached airflow over the fixed wing 40F to provide adequate lift to support the fixed wing aircraft 10F. The reestablishment of the lift of the fixed wing 40F enables a pilot to regain control of the fixed wing aircraft 10F. Although the fixed wing aircraft 10F has been shown as a single engine propeller driven fixed wing aircraft 10F, it should be understood that the same principle of operation applies to a jet aircraft and multi-engine variants of both types.

As discussed above, many in the prior art of which I am aware have attempted to create a hybrid aircraft that combines the benefits of the rotary wing aircraft 10R and the fixed wing aircraft 10F. Unfortunately, the hybrid aircraft of such prior art could not solve the problem of the fundamental difference in the position of the center of mass (CM) between the rotary wing aircraft 10R and the fixed wing aircraft 10F. During vertical takeoff, if the aircraft is to be fundamentally stable, then all hybrid aircraft must be operated as the rotary wing aircraft 10R with the center of mass (CM) being located as a pendulum below the center of lift (CL) of the hybrid aircraft. However, during horizontal flight, if the hybrid aircraft is to be operated as a fixed wing aircraft and be inherently stable, then, the center of mass (CM) must be located forward of the center of lift (CL) of the hybrid aircraft. In such a hybrid, the movement of the center of mass (CM) of the hybrid aircraft creates a period of instability during the transition of the hybrid aircraft from the operation as the rotary wing aircraft 10R to the operation as the fixed wing aircraft 10F.

SUMMARY OF THE INVENTION

Therefore, it is an object of this invention to incorporate the benefits of a vertical takeoff and landing aircraft, e.g., a rotary wing aircraft, and an airplane, e.g., a fixed wing or a flexible wing aircraft, in an improved aircraft that is fundamentally stable in all modes of operation, including horizontal, vertical and transitional flight modes.

Another object of this invention is to incorporate the benefits of a vertical takeoff and landing aircraft, e.g., a rotary wing aircraft, and an airplane, e.g., a fixed wing or a flexible wing aircraft, in an improved aircraft that overcomes the difficulties of the prior art and provides a significant advancement to the aircraft art.

Another object of this invention is to incorporate the benefits of a vertical takeoff and landing aircraft, e.g., a rotary wing aircraft, and an airplane, e.g., a fixed wing or a flexible wing aircraft, in an improved aircraft that is based on an entirely new theory of aircraft design and aircraft control.

Another object of this invention is to provide an improved method of control for aircraft whether in vertical flight, horizontal flight, or any transition mode, thereof.

The present invention provides an aircraft, comprising a fuselage, a lifting wing operatively attached to the fuselage, a boom having opposite distal and proximal end portions, the proximal end portion of said boom being pivotally supported on said fuselage, and an engine for generating a thrust with a thrust source located at the distal end portion of said boom for propelling the aircraft. A freely adjustable (i.e., without pilot intervention) angle of orientation of said boom balances the thrust generated by said engine with the gravitational, lift and drag forces acting upon said aircraft.

In accordance with an aspect of the present invention, the inventive aircraft has a dual pendulum arrangement established, the first being a gravitational pendulum interacting with a second lift/drag pendulum to provide inherent stability in vertical, horizontal and transitional flight modes. The gravitational forces acting on the aircraft create the gravitational pendulum. The lift/drag forces generated by the fuselage and the wing create a lift/drag pendulum which interact with the gravitational pendulum because both pendulums act on the proximal end of the free lever shaft.

In accordance with another aspect of the present invention, a wing, which is preferably a free wing, is incorporated into the inventive aircraft. Preferably, the free wing is attached with its center of lift at or above, and vertically approximate to the center of mass of the inventive aircraft. The freewing is free to pivot without pilot intervention about a spanwise axis at the point of attachment. The free wing contributes to the smooth transition from vertical to horizontal flight. It is within the scope of the present invention, in another embodiment, to provide a pivoting wing which can also be mechanically forced to assume a suitable angle of attack in response to the vectored thrust.

In accordance with yet another aspect of the present invention, the boom acts as a free lever. The boom is free to pivot about its proximal end, preferably at least 90 degrees longitudinally and without necessarily any lateral restriction. A pair of counter rotating proprotors are mounted on the boom. The boom is pivotable about another spanwise axis which is also located at or above the center of mass of the aircraft. Advantageously, the axis of the boom is located between the axis of the free wing center of lift and the center of mass of the aircraft. More advantageously, the proximal end of the boom and the center of lift of the free wing and the center of mass of the aircraft are substantially aligned in a vertical direction. It is also within the scope of the present invention, in another embodiment, to provide a pivoting boom which is mechanically forced to assume a suitable angle of orientation in response to the vectored thrust.

In accordance with a further aspect of the present invention, the inventive aircraft acts as a pendulum in both horizontal flight and vertical flight—as a gravitational pendulum in vertical flight and a lift/drag pendulum in horizontal flight. Any flight between pure vertical or pure horizontal is an interaction of the two pendulums.

In accordance with still another aspect of the present invention, all of the flight control functions, whether in horizontal, vertical or transition flight modes, are resolved into a combination of thrust vectoring and dynamic flight controls.

In accordance with yet another aspect of the present invention, the inventive aircraft further includes a dynamic flight control surface on said boom. The dynamic flight control surface, when operated, imparts a force, perpendicular to its mounting axis, to the boom. As a result, the boom's dynamic balance as a thrust vectored pendulum is displaced and the boom is caused to seek a new equilibrium angle which will balance the forces acting on the distal and proximal ends thereof. Preferably, the dynamic flight control surface is part of a secondary wing which, in turn, is, preferably, a free wing.

In accordance with still another aspect, the invention utilizes a common propulsion system for both vertical and horizontal flight and which method results in an aircraft which is inherently stable in both vertical and horizontal flight and all transitional modes of flight. The invention utilizes a dual pendulum arrangement, the first being a gravitational, or static, pendulum and the second being a lift/drag pendulum created by airflow about the wing and aircraft. The lift/drag pendulum is of a varying or dynamic nature since its force varies upon the speed of the airflow about the wing and aircraft. The effect of the lift/drag pendulum is to reduce the net gravitational forces acting upon the proximal end of the free lever shaft to zero in horizontal flight. The byproduct of the vertical lift produced by the wing is drag in the horizontal which creates a drag pendulum opposed by the thrust of the engine.

The present invention also provides a method of controlling an aircraft in horizontal flight, vertical flight or any transition flight mode between the horizontal and vertical flight. The method comprises controlling the aircraft as a thrust vectored pendulum in all flight modes. The method controls the aircraft as a thrust vectored gravitational pendulum in the vertical and as a thrust vectored lift/drag pendulum in the horizontal. The control of the aircraft during transition between pure vertical and pure horizontal flight is still controlled as a thrust vectored pendulum, the pendulum being the resolution of the net force vectors of the gravitational pendulum and the lift/drag pendulum.

The present invention also provides an aircraft, comprising a fuselage, thrust generating means for generating a thrust for propelling the aircraft, thrust vectoring means for vectoring said thrust to obtain a vectored thrust, and force balancing means for moving said thrust generating means relative to said fuselage, in response to said vectored thrust, to balance gravitational, lift and drag forces acting on said aircraft with said vectored thrust.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

For a fuller understanding of the nature and objects of the invention, reference should be made to the following detailed description taken in connection with the accompanying drawings in which:

FIG. 17 is a front view of the aircraft of FIG. 15;

FIG. 18 is an enlarged view of the right hand side free lever rotary shaft and jet engine of the aircraft of FIG. 17;

FIG. 19 is a side view of FIG. 18;

Similar reference characters refer to similar parts throughout the drawings.

DETAILED DESCRIPTION OF THE INVENTION

Definitions

As used herein, the term "center of thrust" means that point in space at the intersection of the horizontal, vertical, and lateral axis of a thrust.

As used herein, the term "center of drag" means that point in space at the intersection of the horizontal, vertical, and lateral axis of a drag.

As used herein, the term "director" means a mechanism for vectoring the thrust produced by the torque of the aircraft engine.

As used herein, the term "dynamic equilibrium" means a state which remains stable while undergoing constant change within a given operating envelope because any change in inputs within the operating envelope produces a transition toward, but not necessarily an achievement of, a new, but stable, equilibrium.

As used herein, the term "free lever" or "free lever shaft" or "free lever boom" or "free lever rotary shaft" means a lever located in space which is freely pivotable about an axis to assume an angle which balances the forces acting upon the distal and proximal ends of the free lever. In other words, the spatial position of the free lever is determined solely by interaction of the thrust acting on one end of the free lever and the gravitational, drag and lift forces acting on the other end of the free lever.

As used herein, the term "free wing" means a wing attached to an aircraft fuselage in a manner such that the wing is freely pivotable about its spanwise axis. In other words, the free wing has an angle of attack which is determined solely by aerodynamic forces during flight.

As used herein, the term "lift/drag pendulum" or "drag pendulum" means the force vector resolution of the gravitational force acting on the aircraft interacting with the drag forces and the lift forces acting upon the aircraft.

As used herein, the term "static equilibrium" means a stable, fixed equilibrium state to which a system will return to after a disturbance is introduced and then removed.

As used herein, the term "variable coupling" means a coupling which transmits the torque produced by the engine to the rotors via the free lever shaft throughout the free lever shaft range of motion.

Other terms are defined herein where initially discussed.

DETAILED DESCRIPTION

FIGS. 3–6 are various views of the improved aircraft 110 of present invention. The improved aircraft 110 comprises a fuselage 112 and an engine 114. A wing 140, preferably, a free wing, is operatively attached to fuselage 112 to produced lift. The center of mass (CM) of the improved aircraft 110 is underslung as a gravity pendulum below the center of lift or aerodynamic center of the free wing 140.

Figure 6:
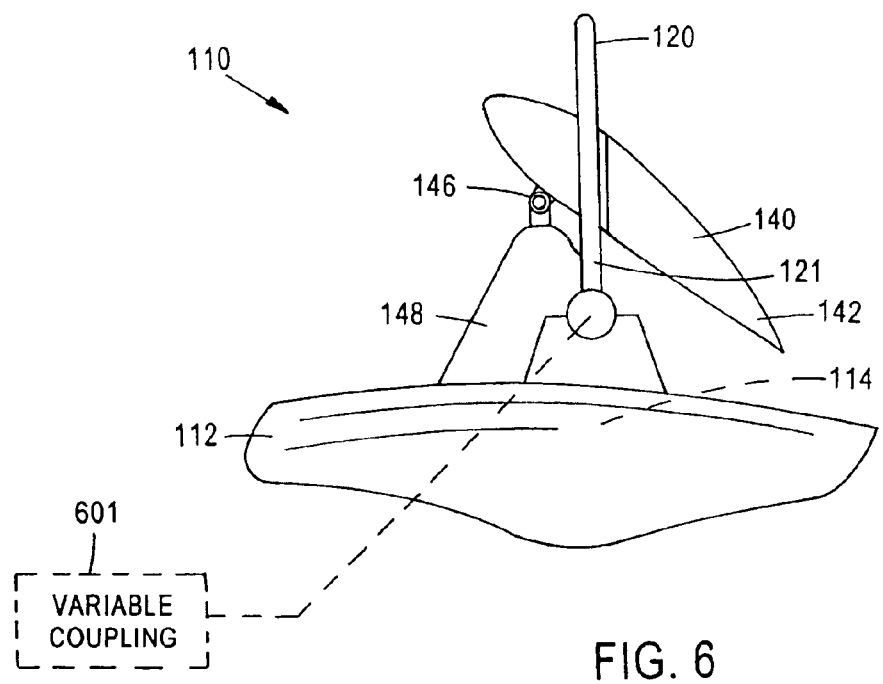
FIG. 6 is a detailed view illustrating a proximal end of a rotary free lever shaft of the improved aircraft of FIG. 3.
Figure 13A:
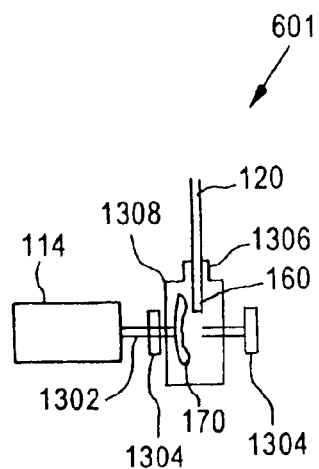
FIG. 13A is a schematic sectional view of a variable coupling which transmits the torque produced by the aircraft engine to the free lever shaft.
Figure 13B:
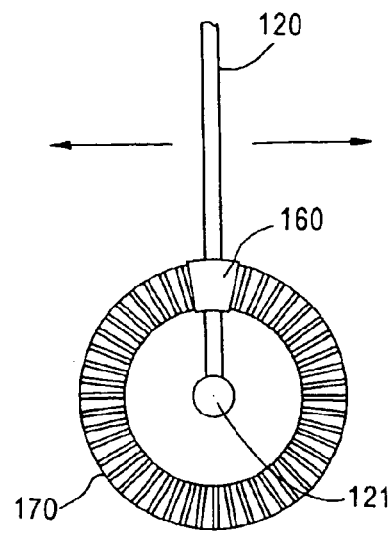
FIGS. 13B and 14 are side views showing the free lever rotary shaft in alternative angular positions.

The engine 114 is coupled to a rotor assembly through a novel free lever shaft or boom 120 extending between a proximal end 121 and a distal end 122 thereof. The proximal end 121 of shaft 120 is coupled to the engine 114 through a variable coupling 601 (FIGS. 6, 13A and 13B). Specifically, proximal end 121 of boom shaft 120 may not be directly connected to engine 114, but simply operatively arranged to transmit engine output. The distal end 122 of the shaft 120 supports counter-rotating rotors 130 of the rotor assembly to provide thrust to the improved aircraft 110. In this example of the invention, the rotor 130 is shown as a counter-rotating rotor 130 having rotor blades 131 and 132. The counter-rotating rotor 130 minimizes any bending moments and unbalanced torque from being applied to free lever shaft 120 or to the fuselage of improved aircraft 110. Advantageously, the free lever operational characteristics of the free lever shaft 120 allows the free lever shaft to freely adjust its angularity to balance the various thrust, gravitational, lift, and drag components during operation of the improved aircraft 110. The minimization of any unbalanced torque applied to the fuselage of the improved aircraft 110 eliminates the need for a tail rotor.

Figure 14:
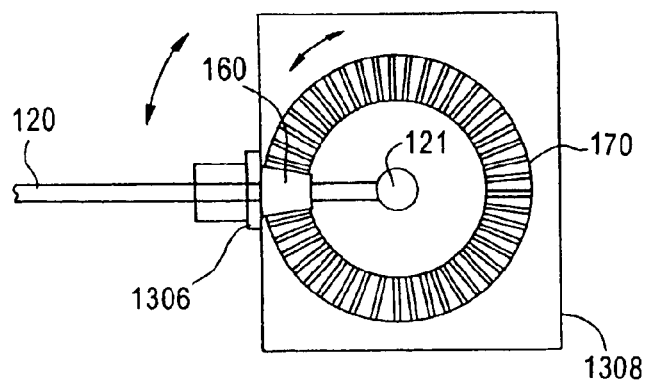
Figure 16:
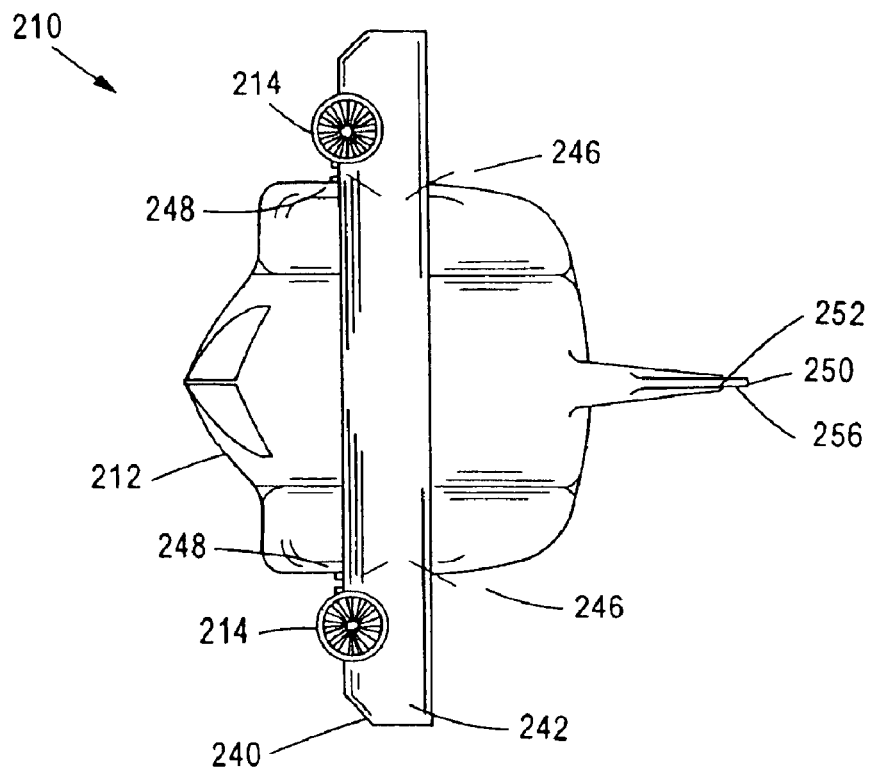
FIG. 16 is a top view of the aircraft of FIG. 15.
Figure 15:
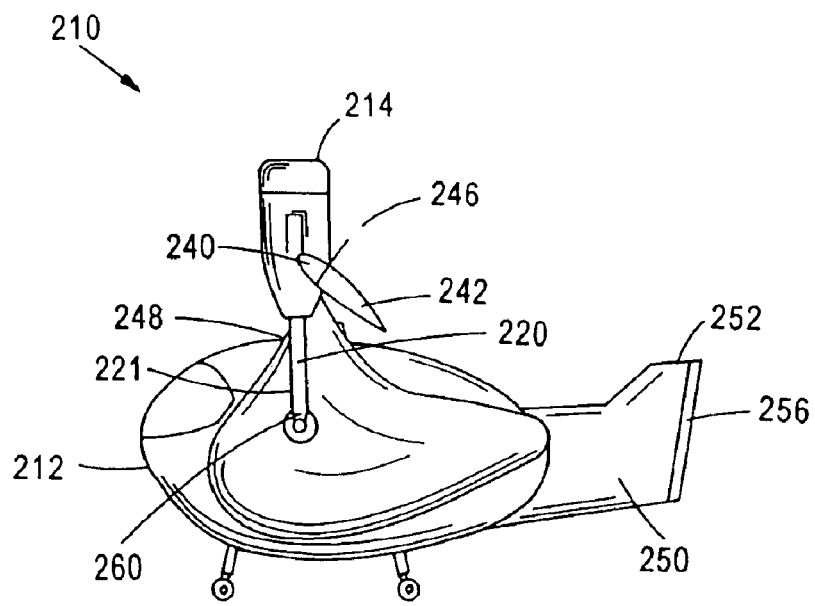
FIG. 15 is a side view of the improved aircraft in accordance with a second embodiment of the present invention, which utilizes jet engines to generate the thrust, with the free lever rotary shaft oriented vertically upwards.

The variable coupling 601 which transmits the torque produced by the aircraft engine 114 to the free lever shaft 120 is schematically illustrated in FIG. 13A. Engine 114 has an engine output shaft 1302 coupled to drive ring gear 170 which, in turn, meshes with a pinion 160 fixed to the proximal end 121 of shaft 120. The torque produced by engine 114 is transmitted from engine output shaft 1302 to ring gear 170 to pinion 160 which causes free lever shaft 120 to rotate about its longitudinal axis. Preferably, the ring gear 170 and pinion 160 are housed in a gearbox case 1308 which is also shown in FIG. 14 but omitted from FIG. 13B. The gearbox case 1308 is rotatably supported at 1304 by the airframe. There is a thrust bearing 1306 disposed between the free lever shaft 120 and the gearbox case 1308. The proximal end 121 of shaft 120 is pivotally supported by the fuselage so that the free lever shaft or boom 120 is allowed to freely pivot about the proximal end, preferably within a predetermined range, as shown in FIGS. 13B and 14. Since the ring gear 170 and pinion 160 are engaged throughout the free lever shaft range of motion, as can be seen in FIGS. 13B and 14, the torque produced by the engine is transmitted to the rotors via the free lever shaft continuously. Preferably, the pivot point of the proximal end 121 of the free lever shaft 120 is coaxial with the engine output shaft 1302. The pivot point of the proximal end 121 is omitted from FIG. 13A for clarity.

As mentioned above, wing 140, which is preferably a free wing, is pivotably secured to the fuselage 112 of the improved aircraft 110. A free wing, as well known in the art (see, for example, U.S. Pat. Nos. 5,509,623, 5,769,359, 5,765,777, 5,560,568, 5,395,073, 5,340,057, and 5,280,863 which are incorporated by reference herein in their entireties), is a wing attached to an aircraft fuselage in a manner such that the wing is freely pivotal (i.e., without pilot intervention) about its spanwise axis which is usually located forward of its aerodynamic center. This arrangement enables the wing to have an angle of attack which is determined solely by aerodynamic forces during flight and, therefore, subject only to aerodynamic pitching moments imposed by wing lift and drag. Rotation of the wing, without pilot intervention, induced by positive or negative vertical wind gusts striking the wing during flight, causes the angle of incidence or pitch between the wing and the aircraft fuselage to vary so that the wing presents a constant angle of attack to the relative wind enabling the aircraft to be essentially stall free during flight. A free wing may be lockable in selected predetermined, fixed angles of incidence with respect to the fuselage for flight in a fixed wing mode. It should be noted that it is within the scope of the present invention to utilize a fixed wing or a mechanically pivoting wing instead of the above-described free wing. However, the use of a free wing in the inventive aircraft has an advantage that the lift produced by the free wing gradually increases as the forward speed of the aircraft increases. In other words, the weight of the aircraft is gradually "transferred" to the free wing. As a result, the aircraft can smoothly change its flight mode from horizontal or vertical flight to any transition flight mode or vice versa. In contrast, if, for example, a fixed wing is used, the fixed wing generally does not produce lift below the stall speed of the aircraft. When the forward speed of the aircraft reaches the stall speed, the weight of the aircraft is "suddenly" transferred to the wing, causing a shock which may be unpleasant to the crew or passengers of the aircraft.

Figure 5:
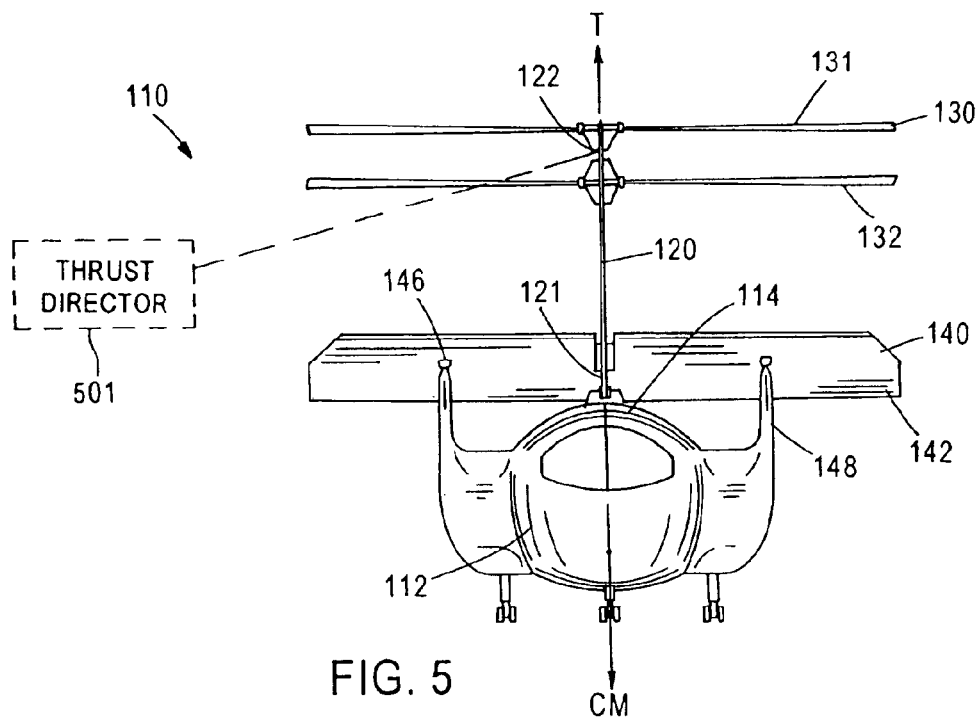
FIG. 5 is a front view of the improved aircraft of FIG. 3.

Preferably, the free wing 140 includes plural ailerons 142 for lateral control in horizontal flight of improved aircraft 110. The angle of attack of the free wing 140 may be adjusted and the lateral control provided during horizontal flight through the use of plural elevons. As can be seen in FIG. 5, freewing 140 is pivotally connected, at 146, to a supporting portion 148 of fuselage 112 for free rotation about a spanwise axis 146.

The improved aircraft 110 may include any number of means of controlling yaw stability in horizontal flight including wing tip vertical stabilizers and rudders, tail mounted vertical stabilizers and rudders, or clam-shell ailerons. The improved aircraft 110 may include any number of means of controlling yaw stability in vertical flight including ventral rudders within the rotor wash, or differential rotor torque. In the illustrated embodiment, the improved aircraft 110 includes tail section 150 rigidly secured to the fuselage 112 having a vertical stabilizer 152 and rudder 156.

In contrast to the rotary wing aircraft 10R of the prior art, the free lever shaft 120 and the rotor 130 of the improved aircraft 110 are free to move dynamically to balance thrust and drag forces as the rotor shaft operates between a substantially vertical orientation and a substantially horizontal orientation. The shaft 120 and the rotor 130 are freely pivotable relative to the fuselage between a substantially vertical direction and a substantially horizontal direction without tilting the fuselage 112.

The rotor 130 of the improved aircraft 110 provides a common thrust (T) for the improved aircraft 110 whether the aircraft is in vertical or horizontal flight. The free wing 140 of the improved aircraft 110 provides a variable lift (L), depending upon the speed of airflow about the wing, for the improved aircraft 110, which lift, while not linear in relationship to the horizontal speed of the improved aircraft 110, is without discontinuities because the wing cannot stall. The center of mass (CM) of the improved aircraft 110 is located at or below the center of lift (L) of the free wing of the improved aircraft 110. In the embodiments of FIGS. 3–23, the center of mass (CM) of the improved aircraft is located below the center of lift (L) of the free wing or wing. In the embodiment of FIGS. 24–30, the center of mass (CM) of the improved aircraft is located substantially co-elevational with the center of lift (L) of the wing or free wing when the fuselage is oriented horizontally.

The thrust (T) of the rotor 130 provides a lift and/or forward thrust for the improved aircraft 110. The lift and/or forward thrust provided by rotor 130 can vary depending on the forward tilt angle θ of boom 120, as will be best understood in the following description with reference to FIGS. 7–11. The pivotable free wing 140 provides a lift and drag for the improved aircraft 110. The lift and drag provided by freewing 140 can vary depending on the airflow about the freewing and, hence, on the forward thrust provided by rotor 130. The variable lift and/or variable forward thrust of the rotor 130 and the variable lift of the pivotable free wing 140 and the characteristic free lever movement of the shaft 120 act in concert for providing the proper forward thrust and proper upward lift to the improved aircraft 110 as will be explained in greater detail hereinafter. The free wing 140 supplies the necessary vertical lift to the improved aircraft 110 lost by the angular orientation of the rotor 130.

Figure 7:
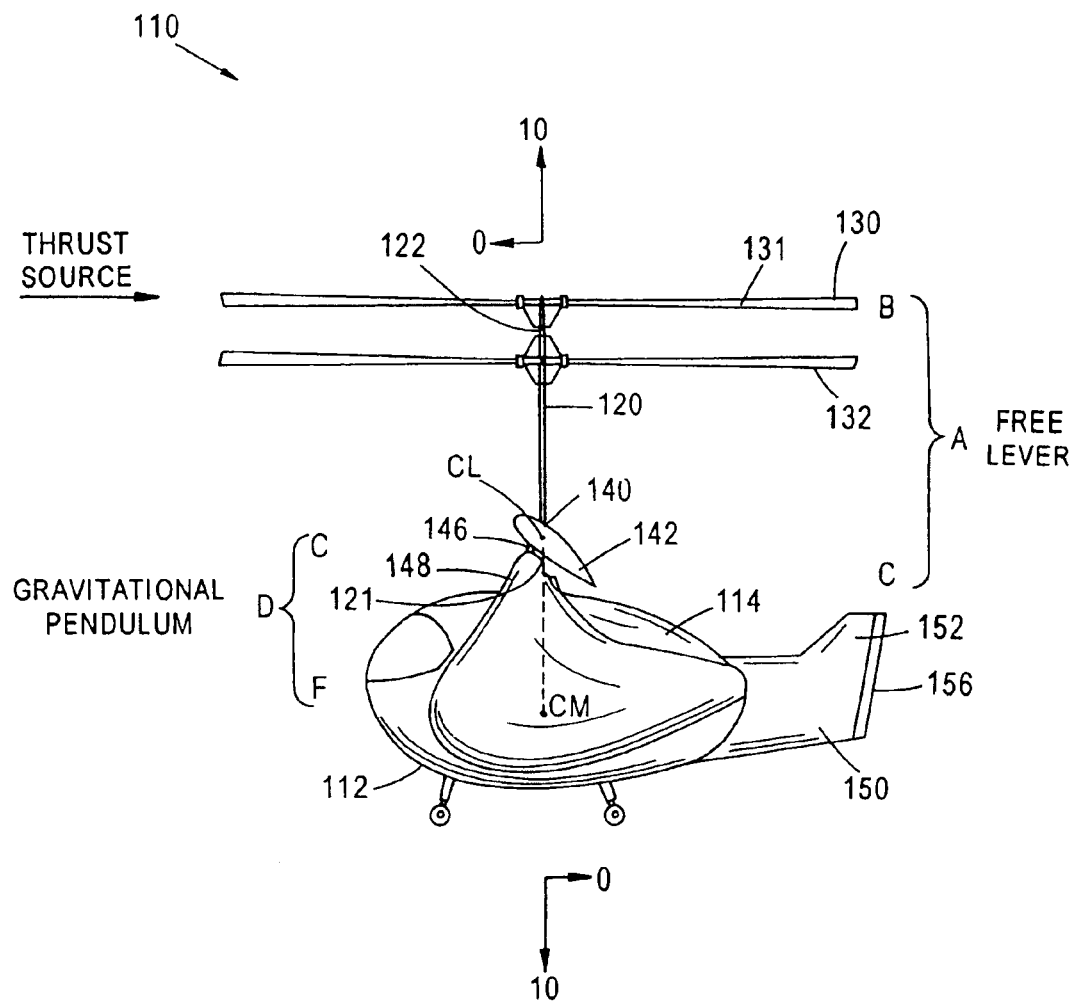
FIG. 7 is diagram of the improved aircraft of present invention illustrating a free lever boom and counter-rotating rotors in a vertical orientation for operation on a vertical takeoff mode.
Figure 8:
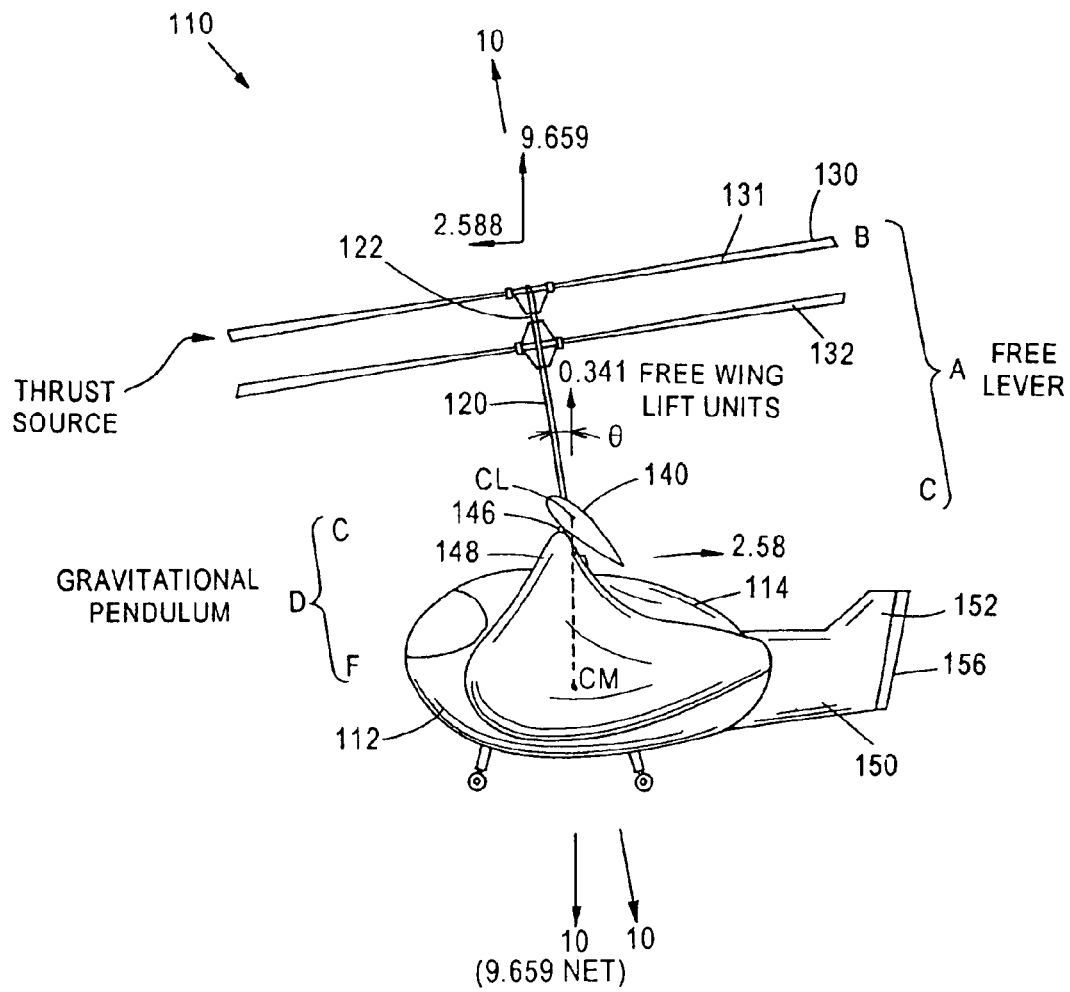
FIG. 8 is diagram similar to FIG. 7 illustrating the free lever rotary shaft and rotors in a somewhat forward orientation for effecting forward motion to the improved aircraft.
Figure 9:
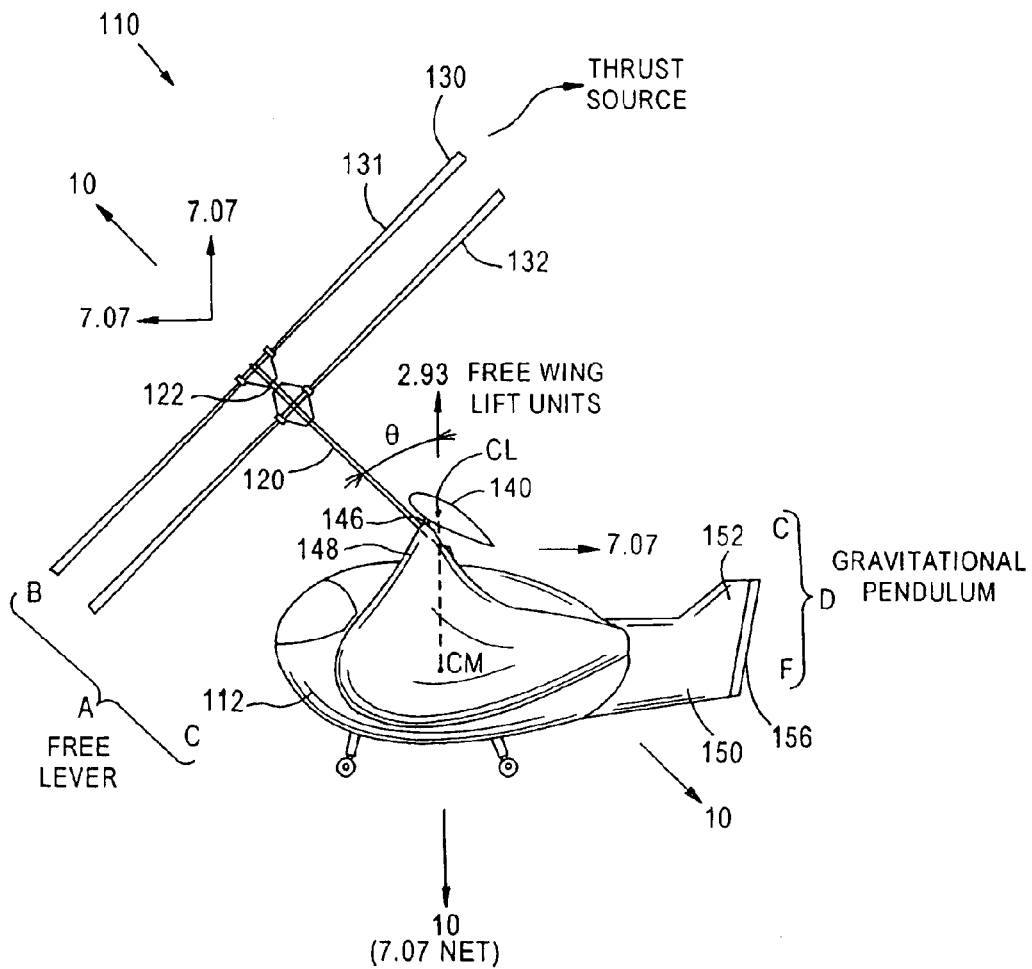
FIG. 9 is diagram similar to FIG. 8 illustrating the free lever rotary shaft and rotors in an increased forward transitional orientation for effecting increased forward motion to the improved aircraft.
Figure 10:
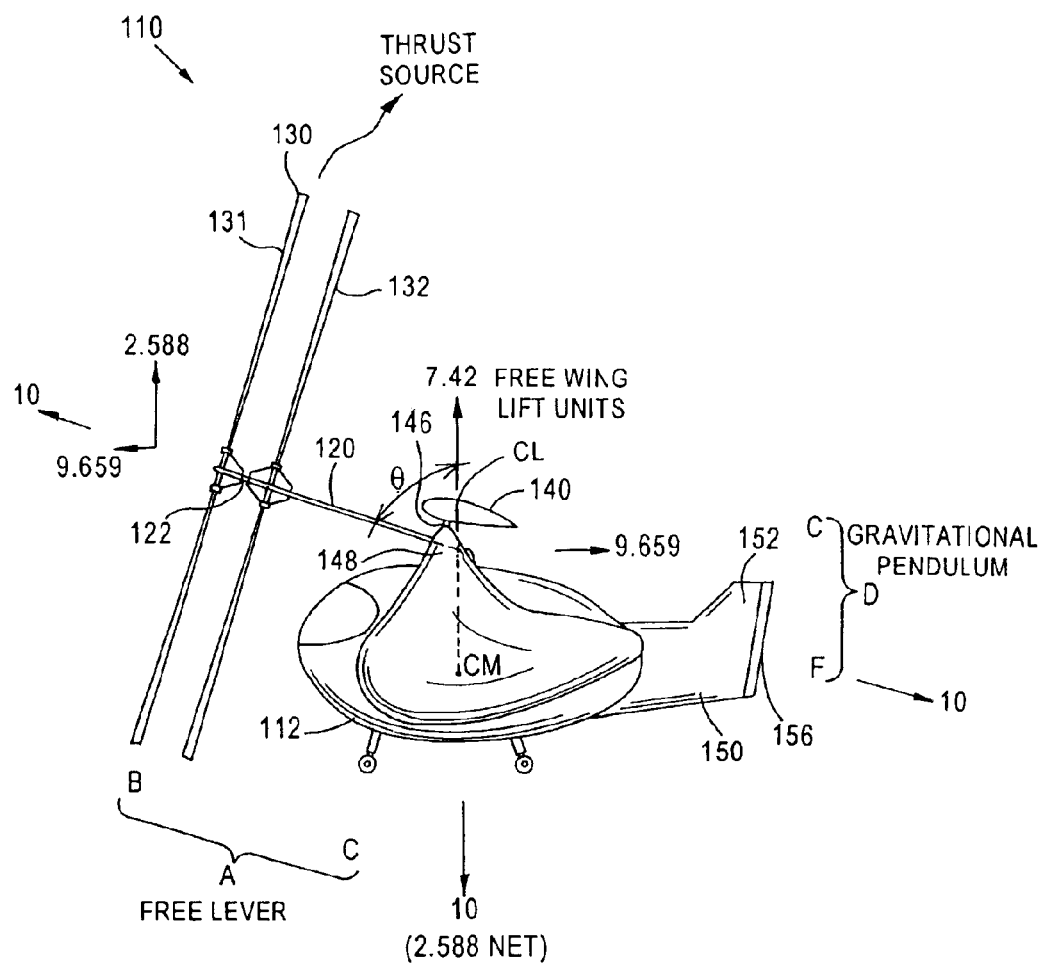
FIG. 10 is diagram similar to FIG. 9 illustrating the free lever rotary shaft and rotors in a yet further forward transitional orientation for effecting further forward motion to the improved aircraft.

FIG. 7 is a diagram of the improved aircraft 110 illustrating the angular position of the rotor shaft 120 and the rotor 130 for enabling the improved aircraft 110 to ascend in vertical mode.

Figure 1:
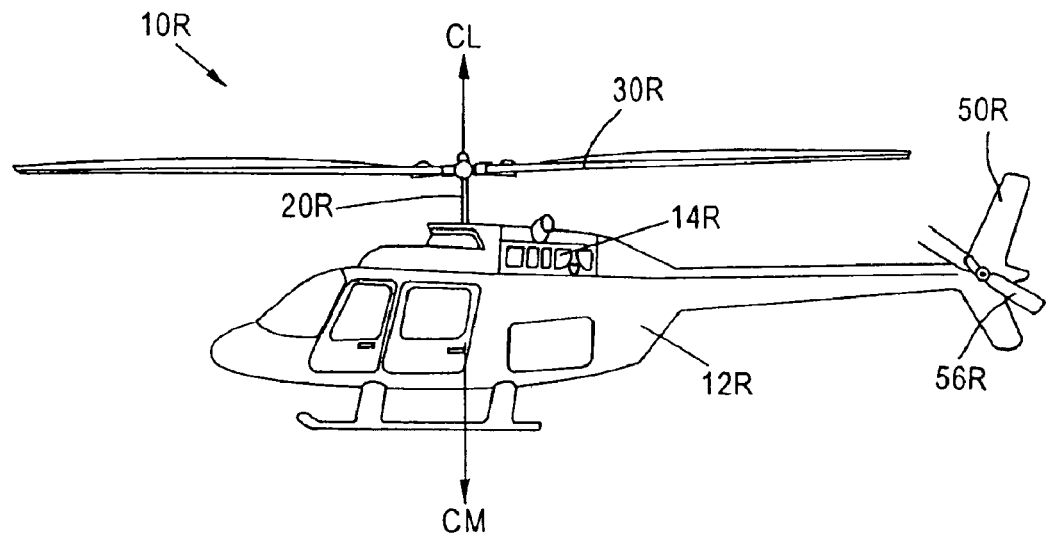
FIG. 1 is a side view of a conventional rotary wing aircraft.
Figure 2:
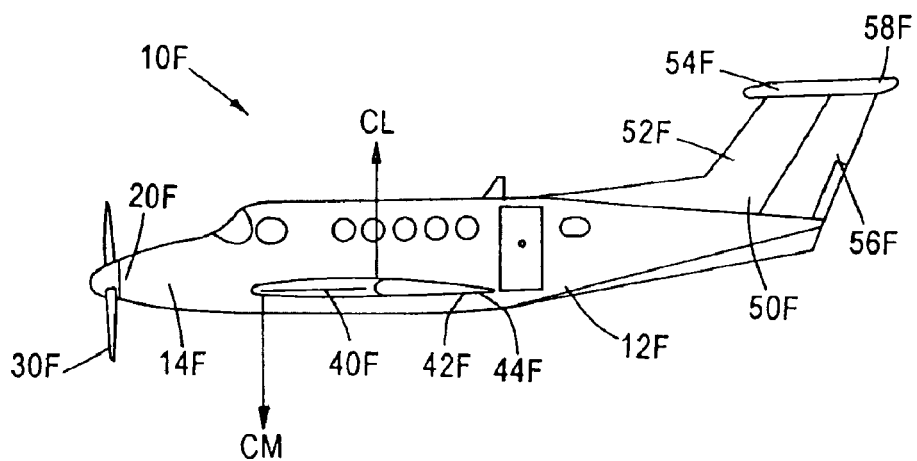
FIG. 2—is a side view of a conventional fixed wing aircraft.
Figure 4:
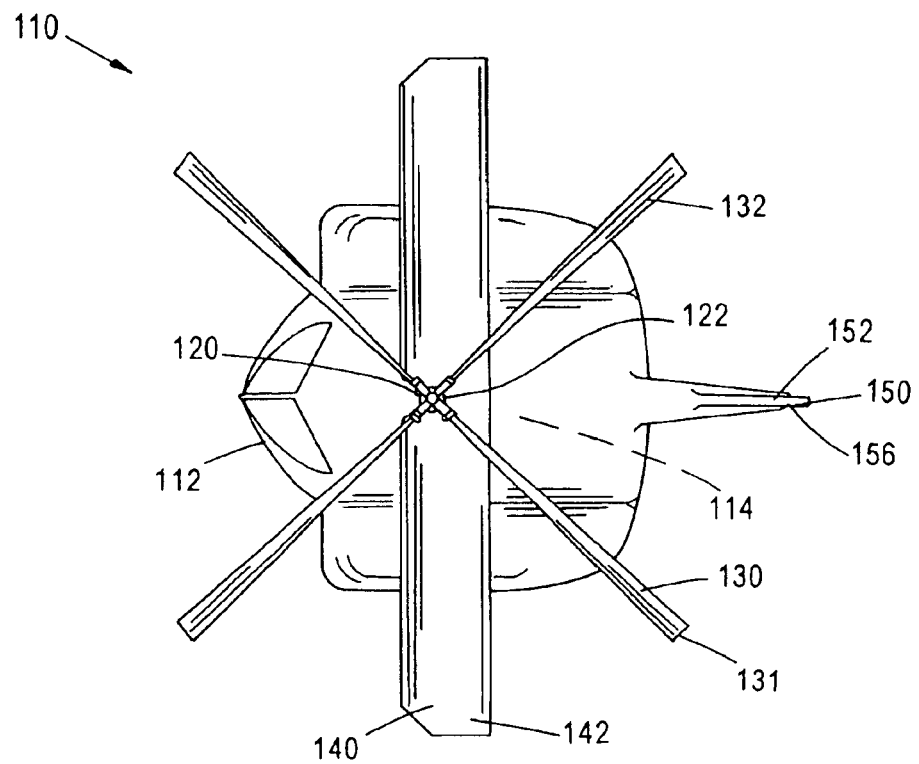
FIG. 4 is a top view of the improved aircraft of FIG. 3.
Figure 3:
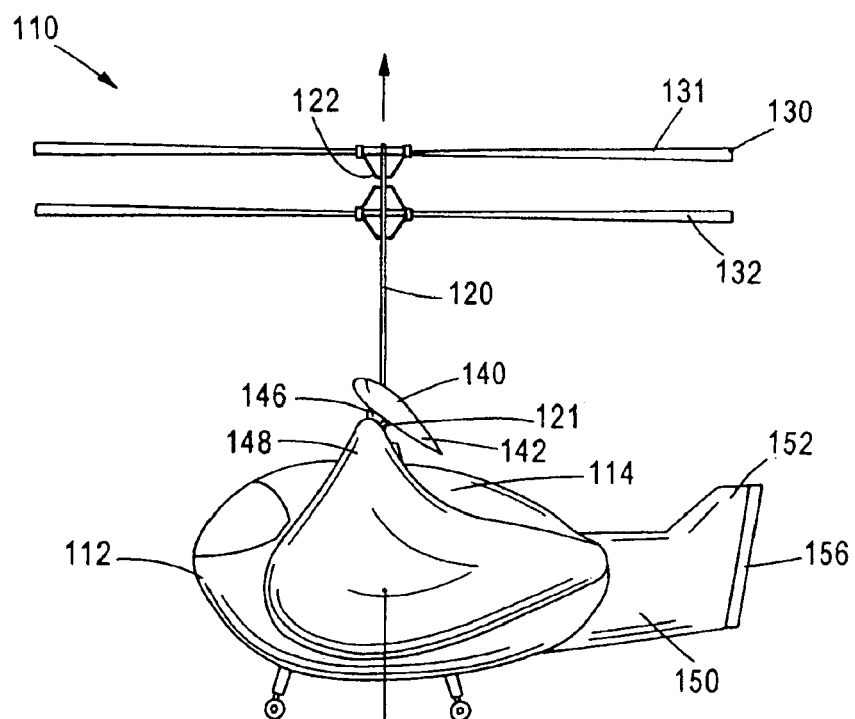
FIG. 3 is a side view of an improved aircraft of the present invention in accordance with one embodiment thereof.

The rotor shaft 120 and the rotor 130 are oriented in a vertical orientation. When the rotor shaft 120 is oriented in a vertical orientation, all of the thrust of the rotor 130 is directed in an upward direction. The center of mass (CM) of the improved aircraft 110 is located below the center of lift of the vertically oriented rotor shaft 120. The free wing 140 provides minimal or no lift for the improved aircraft 110 under this mode of operation. In this mode of operation, the improved aircraft 110 functions much as the rotary wing aircraft 10R shown in FIG. 1 with a sling load.

FIGS. 8–11 are diagrams similar to FIG. 7 illustrating the rotary shaft 120 and rotor 130 in progressively forward orientations from the vertical. The thrust from rotor 130, acting on the distal end 122 of the free lever shaft, is vectored (e.g. by a pilot-controlled director 501 schematically shown in FIG. 5) to produce a forward motion to the improved aircraft 110. The forward motion produces lift and drag forces upon the freewing and the fuselage. The net gravitational forces produce a force which acts upon the proximal end 121 of the free lever shaft 120. The lift and drag forces also act upon the proximal end 121 of the free lever shaft to establish a new angularity for the free lever shaft which will balance the thrust forces acting on the distal end of the free lever shaft interacting with the gravitational force and the lift and drag forces acting upon the proximal end of the free lever shaft. The free lever shaft 120 and rotor 130 assume an orientation in the forward direction which balances the thrust forces acting on the distal end of the free lever shaft opposed by the gravitational, lift and drag forces from the wing and aircraft acting upon the proximal end of the free lever shaft. The free lever shaft 120 is stabilized when the forces acting on its distal and proximal ends 122, 121 are balanced. Vectoring the thrust, by pilot or flight control intervention, at an angle different than the stabilized angle will cause the free lever shaft to automatically seek a new equilibrium angle which balances the thrust, gravitational, lift, and drag forces acting upon the aircraft.

In FIGS. 8–11, the rotary shaft 120 is stabilized at various angles (15°, 45°, 60°, and 90°, respectively) in the forward direction. A vertical component (T. cos θ) of the thrust (T) is directed in an upward direction for lifting the improved aircraft 110. A horizontal component (T. sin θ) of the thrust (T) is directed in a horizontal direction for moving the improved aircraft 110 in a forward direction. The forward motion of the improved aircraft 110 created airflow across the free wing 140. The rear edge of free wing 140 gradually rotates upwards (as can be seen in FIGS. 7–11) to provide an upward lift for lifting the improved aircraft 110. The vertical component (T. cos θ) of the thrust (T) added to the upward lift of the free wing 140 provides the required lifting capacity to maintain the improved aircraft 110 at a stable elevation.

Figure 11:
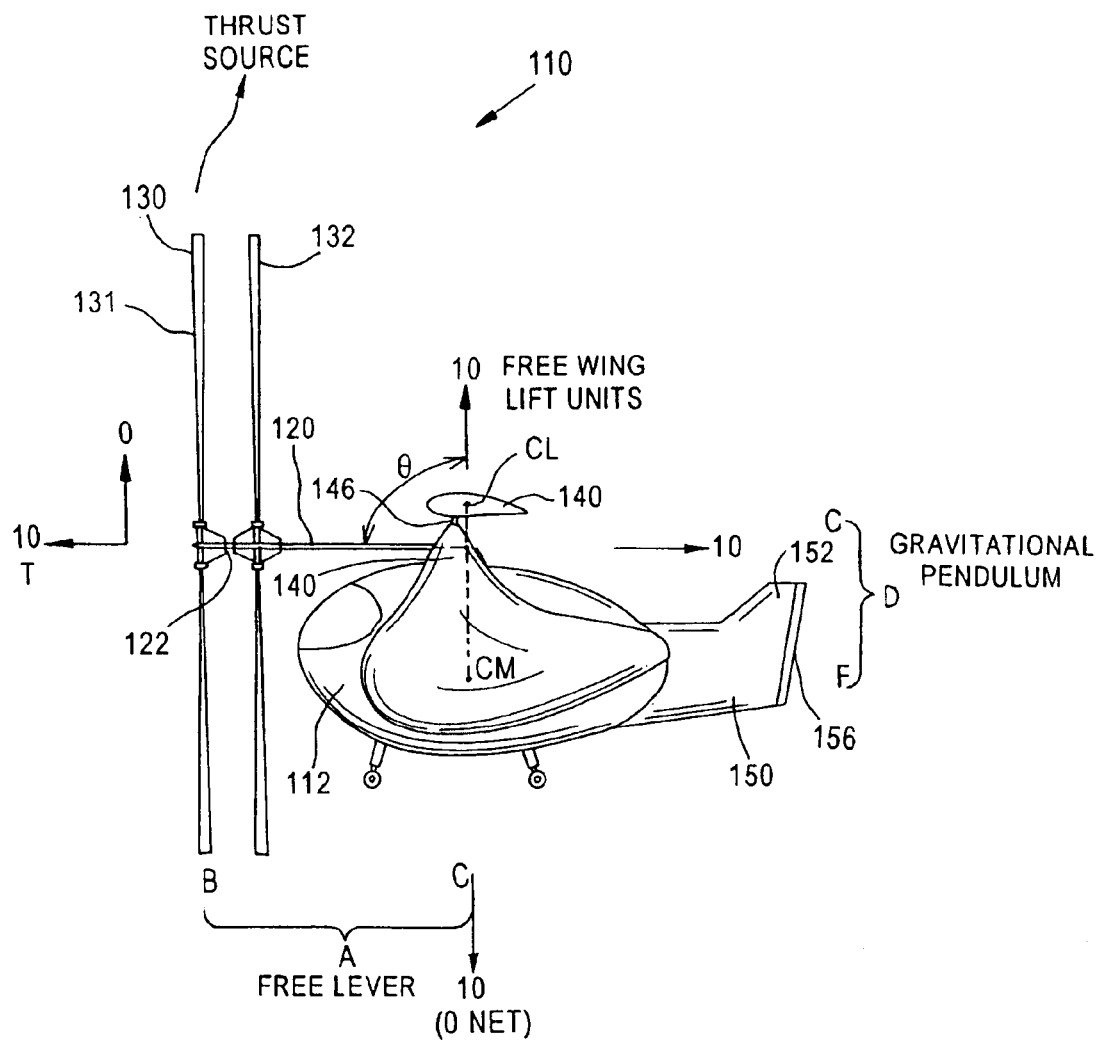
FIG. 11 is diagram similar to FIG. 10 illustrating the free lever rotary shaft and rotors totally oriented in the forward direction for effecting total forward thrust to the improved aircraft by the rotors and with all vertical lift provided by the free wing.
Figure 12:
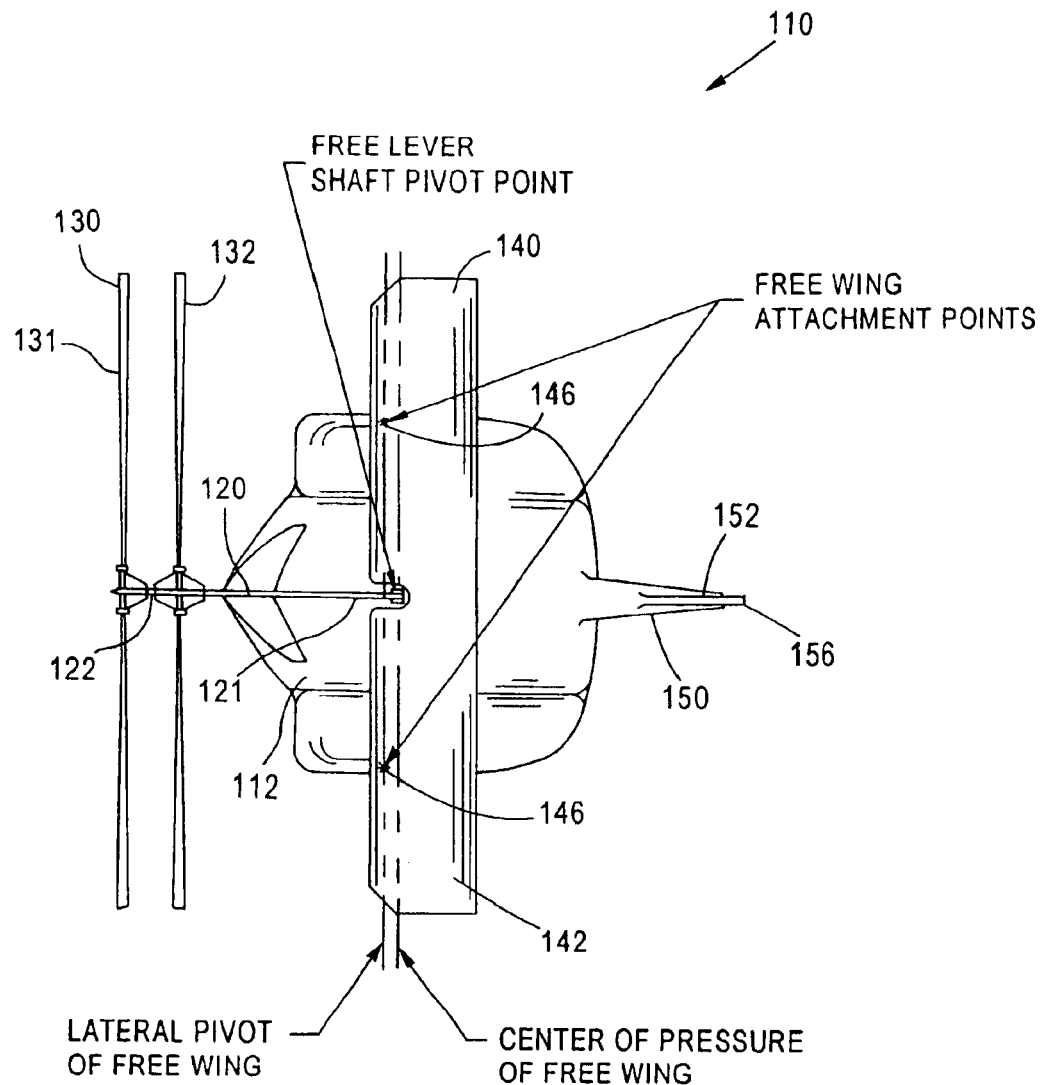
FIG. 12 is a top view of the aircraft with the boom in the forward direction as shown in FIG. 11.

In FIG. 11, the vertical component of the thrust (T) for lifting the improved aircraft 110 is zero. The horizontal component of the thrust (T) for moving the improved aircraft 110 in the forward direction is (T). The upward lift of the free wing 140 provides the total required lifting capacity for lifting the improved aircraft 110. The aircraft airspeed is such that the drag about the improved aircraft 110 is equal to the thrust (T).

As mentioned previously, the free lever shaft 120 is free to angularly orient its distal end 122 to obtain a dynamic equilibrium between the thrust components being applied to the distal end of the free lever 120 by the aircraft engine 114, balanced by the lift and drag components of the free wing, the drag components of the fuselage, and the gravitational force acting upon the proximal end of the free lever shaft. From a given equilibrium, a director (schematically shown at 501 in FIG. 5) vectors the horizontal and vertical thrust produced by the aircraft engine and the free lever shaft is caused to freely adjust its angularity about its proximal end 121 to obtain a desired new equilibrium. The thrust vectoring may be accomplished through any number of means common to the art, such as a collective and swash plate controlling the pitch of the rotor blades, servo tabs on the rotor-blades, or a gimballing mechanism on the rotor shaft. Another exemplary thrust director is described in U.S. Pat. No. 5,507,453 which is incorporated by reference herein in its entirety.

As an example of the function of the director 501, for a given forward speed in stable horizontal flight, if the director varies the given horizontal and vertical thrust components such that more vertical thrust is produced compared with the horizontal thrust, then the free lever shaft will freely rotate about its proximal end to seek a new equilibrium for the aircraft, i.e., at a lower airspeed, but with an increasing altitude.

The above described structure of the aircraft in accordance with the present invention includes a dual pendulum arrangement with a gravitational pendulum interacting with a lift/drag pendulum to provide inherent stability in vertical, horizontal and any transitional flight modes. The gravitational or static pendulum D extends from F or the center of mass CM of the aircraft to the pivot point C of the proximal end 121 of the free lever shaft 120. The free lever or dynamic pendulum A extends from the center of thrust B at the distal end 122 of the free lever shaft 120 to the pivot point C of the proximal end 121. As best seen in FIG. 7, when the improved aircraft is in the pure vertical, the gravitational pendulum and free lever pendulum overlap and coincide to include a pendulum mass at F or the center of mass CM of the aircraft and a moment arm equal to the distance from the center of thrust B to the center of mass CM of the aircraft.

Since the free lever shaft is freely pivotable at pivot point "C", which is the proximal end of the free lever, all forces from the center of mass act upon the proximal end of the free lever. The wing creates a lift and drag force upon airflow about the wing which acts upon the aircraft, but since mounted within the aircraft is the pivotable end of the free lever, all lift and drag forces from the wing act upon the proximal end of the free lever. The fuselage creates a drag (and perhaps a lift) force upon airflow about the fuselage which acts upon the aircraft, but since mounted within the aircraft is the pivotable end of the free lever, all lift and drag forces from the fuselage resolve to act upon the proximal end of the free lever. The gravitational forces create a gravitational pendulum and the lift/drag forces create a lift/drag pendulum which interact because both act on the proximal end of the free lever shaft.

In the improved aircraft, the gravitational forces interacting with the lift/drag forces of the aircraft, all acting upon the proximal end of the free lever shaft, creates a dynamic pendulum which is a force vector resolution of said forces. The creation of lift by the wing, and its byproduct drag, causes the progressive reduction of the net gravitational force acting on the proximal end of the free lever shaft to be reduced to zero and, simultaneously, causes the progressive increase in the horizontal drag force acting on said proximal end to be increased equal to the thrust acting on the distal end. When the net gravitational force acting on said proximal end is equal to zero, the free lever shaft can be balanced in a horizontal angle.

Although, in the foregoing section, the freewing and the free lever shaft are described to be freely pivotable, it should be understood that it is possible to limit the freely pivotable movement of the free wing and/or the free lever shaft to within a predetermined range. For example, stops (not shown) may be provided to prevent free lever shaft 120 from pivoting beyond the horizontal and vertical positions depicted in FIGS. 11 and 7, respectively. Within the angular sector defined by the horizontal and vertical positions, the free lever shaft is freely pivotable. It is within the scope of the present invention to provide a locking mechanism for locking the free lever shaft at a predetermined angle, e.g., vertical, when the improved aircraft is stationary on the ground prior to firing the aircraft engine. The locking mechanism is released to allow the free lever shaft to pivot freely during flight.

FIGS. 15–23 are illustrations of a second embodiment of the present invention wherein the rotor is replaced with jet engines 214 which can also be prop engines, etc. In this embodiment, two free lever shafts 220 each supporting one jet engine 214 are used. It is, however, within the scope of the present invention to provide any other number of free lever shafts and jet engines.

Each jet engine 114 is coupled through one free lever shaft 220 extending between a proximal end 221 and a distal end 222. The proximal end 221 is pivotally supported by the fuselage 212 via elements 260, 270.

The improved aircraft 210 in this embodiment also includes a wing 240, which is preferably a free wing like the free wing illustrated in FIGS. 3–11 of the first embodiment. Preferably, the free wing 240 includes plural ailerons 242 for lateral control in horizontal flight of the improved aircraft. The angle of attack of the free wing 240 may be adjusted and the lateral control provided during horizontal flight through the use of plural elevons. Freewing 240 is connected to a supporting portion 248 of fuselage 212 for free rotation about a spanwise axis 246. The improved aircraft 210 further includes tail section 250 rigidly secured to the fuselage 212 having a vertical stabilizer 252 and rudder 256.

Figure 20:
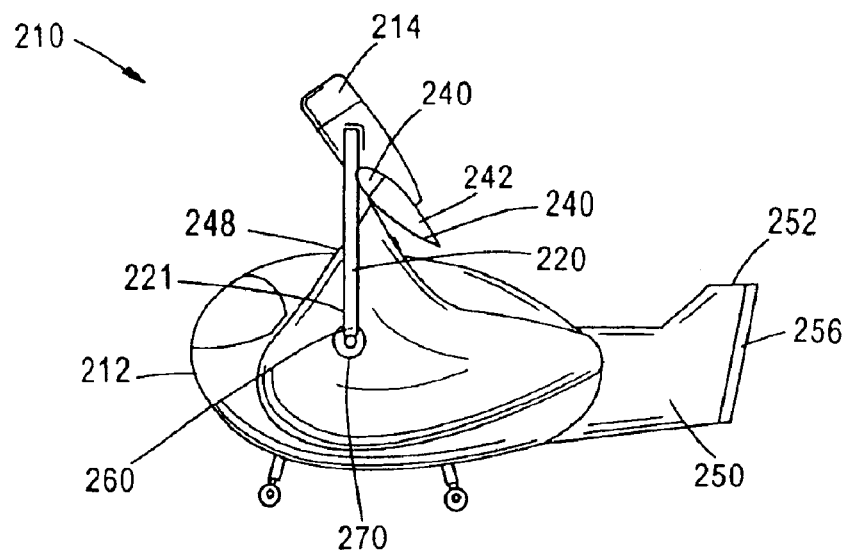
FIGS. 20–21 and 23 are diagrams showing the aircraft of FIG. 15 in various flight modes with the free lever rotary shaft assumes various orientations.
Figure 21:
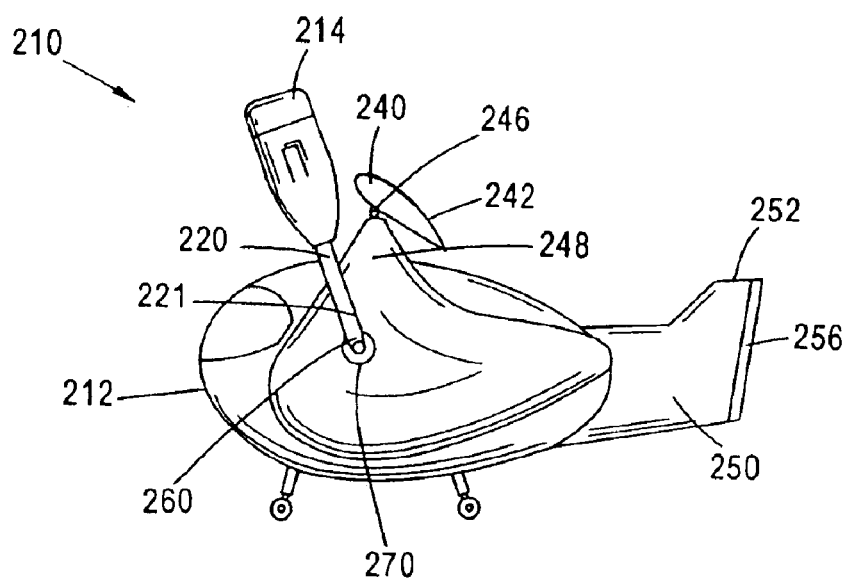
Figure 22:
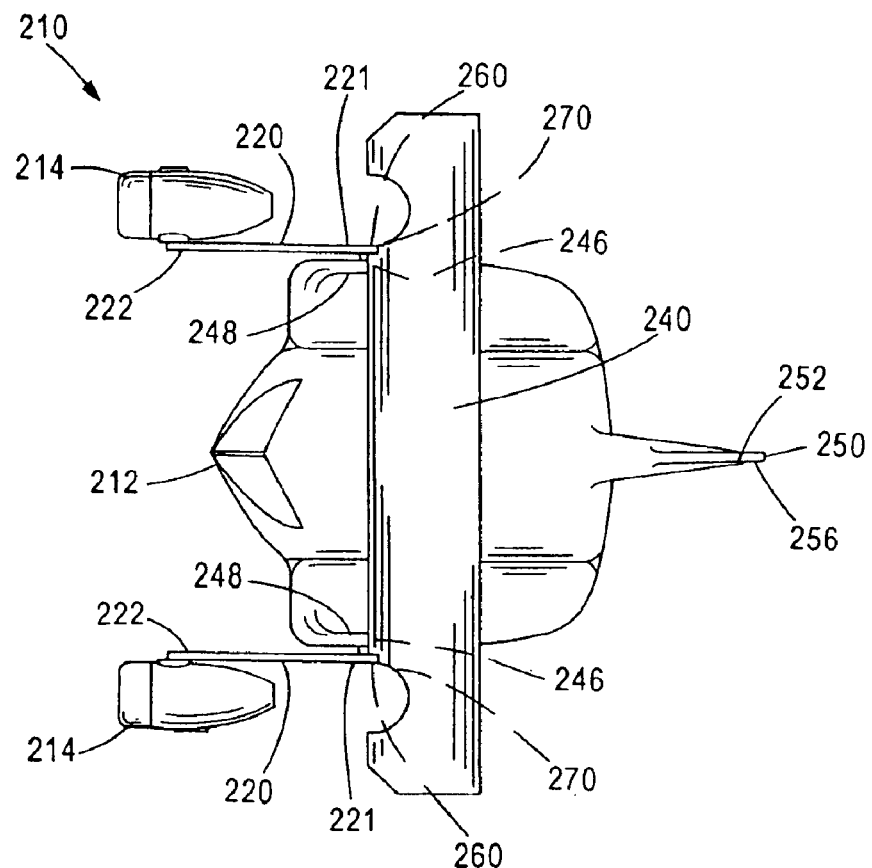
FIG. 22 is top view of FIG. 23.
Figure 23:
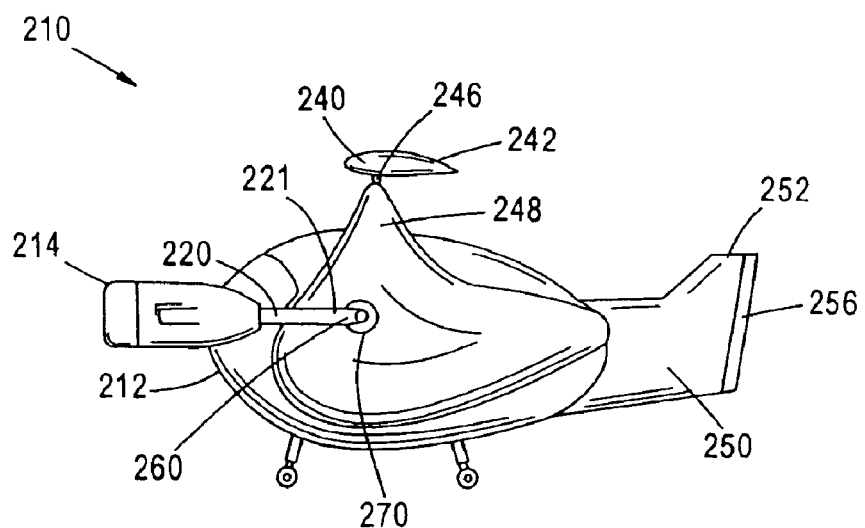
Figure 24:
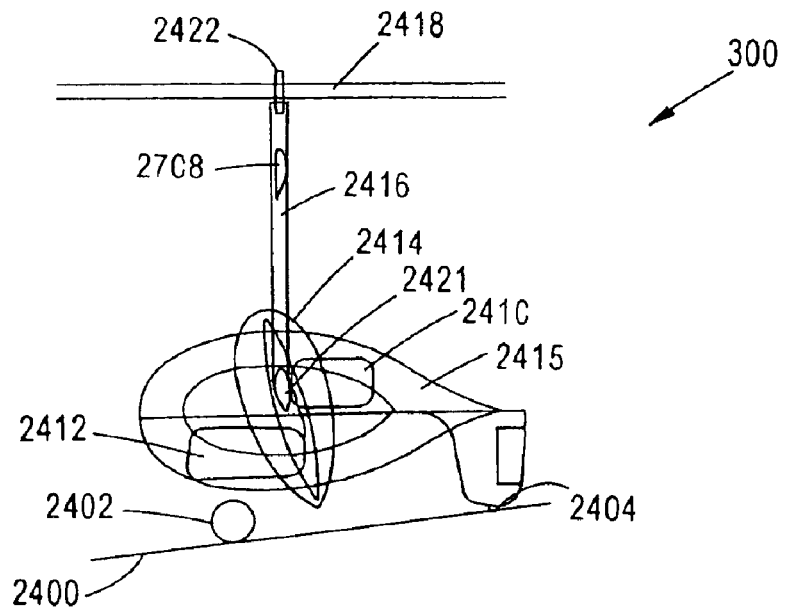
FIG. 24 is a concept drawing showing a side view of an aircraft, in accordance with another embodiment of the present invention, on the ground prior to vertical taking off.
Figure 25:
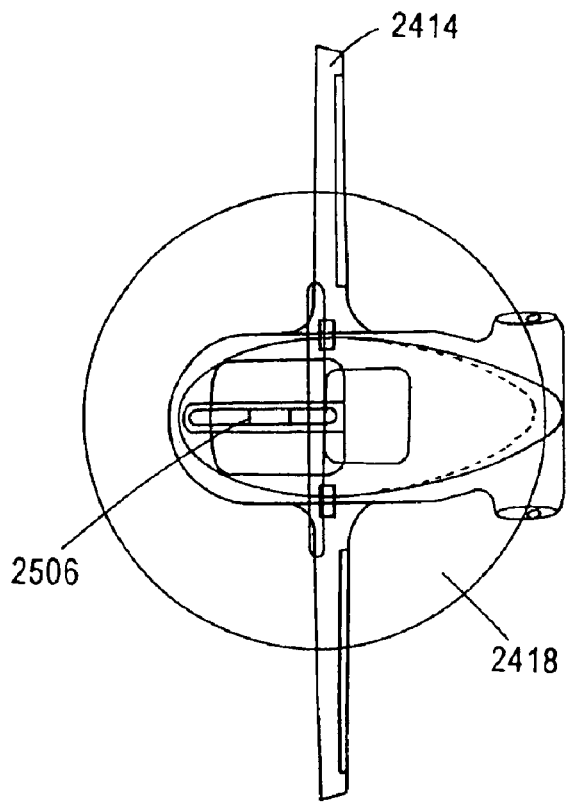
FIG. 25 is a concept drawing showing a top view of the aircraft of FIG. 24.
Figure 26:
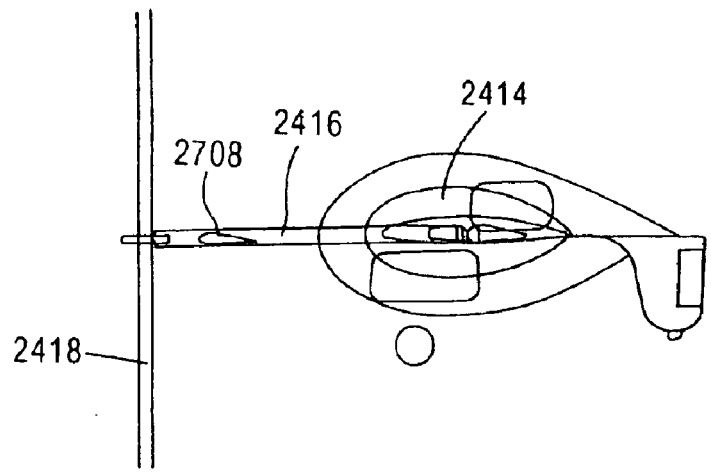
FIG. 26 is a concept drawing showing a side view of the aircraft of FIG. 24 during horizontal flight.

The improved aircraft 210 functions similarly to the aircraft 110 of the first embodiment. In particular, when the thrust generated by jet engines 214 is vectored, e.g., as shown in FIG. 20, free lever shaft 220 is caused to freely pivot to seek a new dynamic equilibrium as illustrated in FIG. 21. Preferably, in the new dynamic equilibrium of FIG. 21, the free lever shaft 220 is slanted generally at the same angle as the thrust line of the vectored thrust (generally, the axial direction of the jet engine 214 as shown in FIG. 20). FIGS. 22–23 show the aircraft of the second embodiment in horizontal flight with the booms 220 and the thrust lines of the jet engines 214 oriented horizontally. Note, the angle of attack of free wing 240 changes gradually from FIG. 21 to FIG. 23.

The thrust generated by two jet engines 214 may be vectored synchronically or separately. The jet engines may be replaced with propellers or turboprops.

FIGS. 24–30 show a third embodiment of the present invention which is basically similar to the first embodiment. In particular, aircraft 300 is illustrated as being stationary on ground 2400 prior to taking off. Aircraft 300 includes fuselage 2415, free wing 2414, wheels or landing gear 2402, 2404, and free lever shaft 2416 having a proximal end pivotally supported by the fuselage and a distal end supporting rotor 2418.

Figure 27:
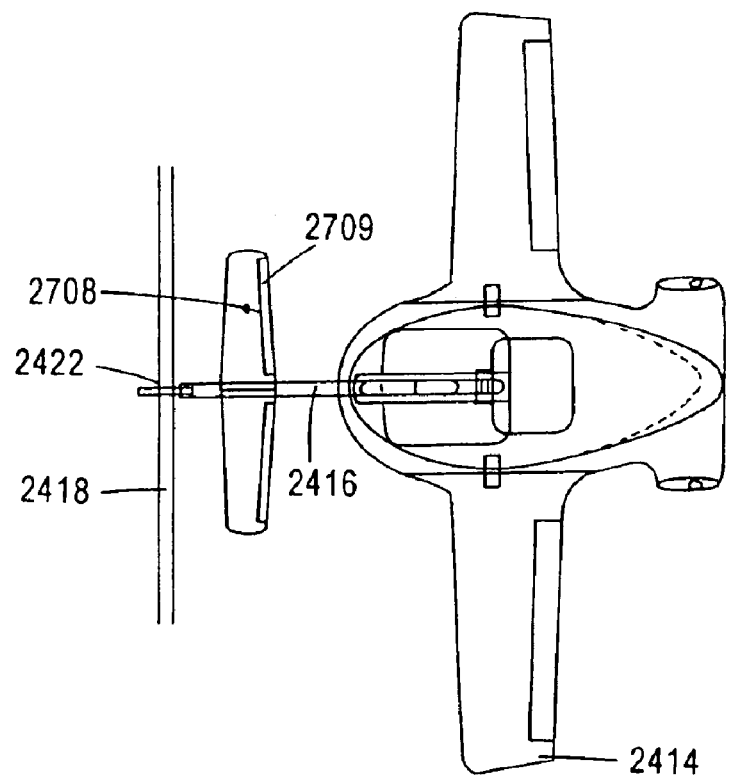
FIG. 27 is a concept drawing showing a top view of the aircraft of FIG. 26.
Figure 30:
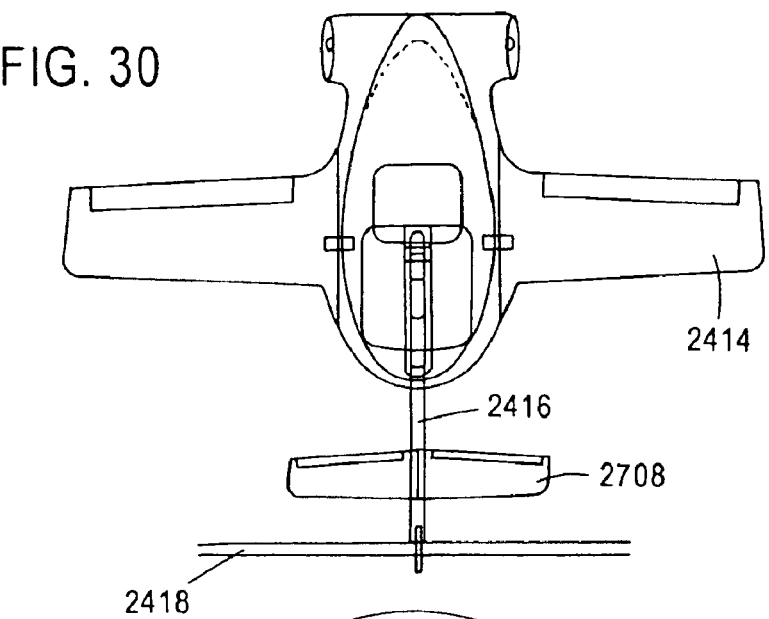
FIG. 30 is a top view of FIG. 28.
Figure 28:
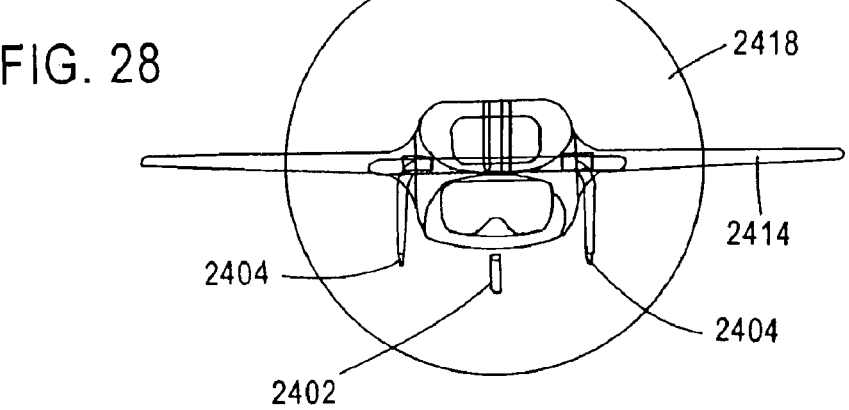
FIG. 28 is a front view of FIG. 27.

This embodiment is different from the first embodiment in that secondary lateral and ventral dynamic flight control surfaces, e.g., 2709, are attached to the free lever shaft between the distal and proximal ends, 2422, 2421 of said shaft, and, preferably, towards the distal end 2422 as best seen in FIG. 27.

Figure 29:
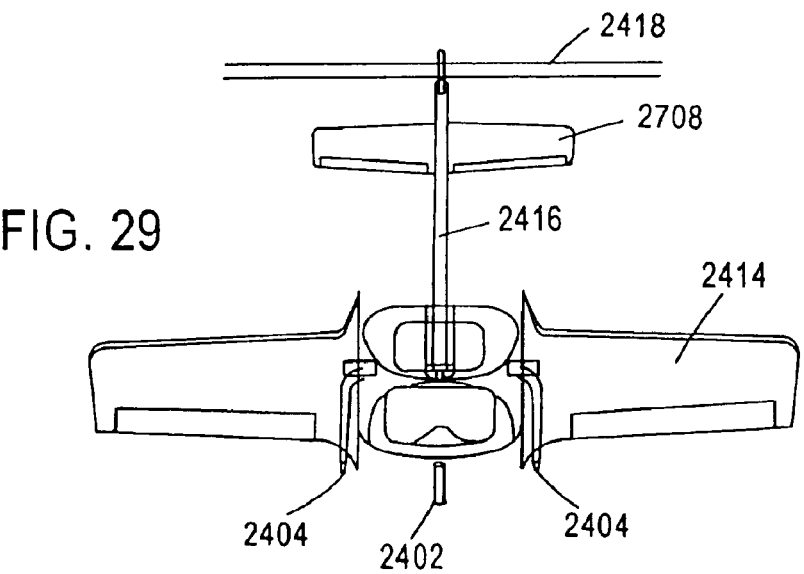
FIG. 29 is a front view of FIG. 24.

The lateral dynamic flight control surface may be a wing with control surfaces, a pivotable wing, or in accordance with a preferred embodiment of the present invention, a freewing 2708 with control surfaces 2709. A secondary free wing is preferred because in vertical or near vertical flight as shown in FIG. 29, the lift caused by the vertically oriented thrust is not significantly affected by the presence of the secondary wing. The ventral dynamic flight control surface (not shown) may be wing tip vertical rudders, wing tip clam-shell type rudders, or a cruciform rudder.

In the first embodiment, the vectoring of the thrust produced by the rotor 130 is accomplished as, e.g., in a conventional helicopter, i.e., by varying the angle of attack by the rotor blades 131, 132 as the rotor blades are rotated. This variation of the blade angle of attack might be accomplished, in accordance with an aspect of the present invention, by the use of swashplates, or by servo tabs on the rotor blades. In accordance with another aspect of the present invention, the entire rotor head (near reference numeral 122 in FIG. 3) might be angled by a gimballing mechanism of the rotor shaft. However, all of these methods are relatively mechanically complex. The secondary lateral (e.g., 2709) and ventral control surfaces of the third embodiment provide a new, improved and simplified method of vectoring the thrust acting on the distal end of the free lever.

More specifically, in the third embodiment, the secondary wing 2708 has the lateral dynamic flight control surfaces 2709 which impart a force perpendicular to the secondary wing lateral mounting to the free lever shaft. The free lever shaft's dynamic balance as a thrust vectored pendulum is displaced and the shaft is caused to seek a new equilibrium angle which will balance the forces acting on the distal and proximal ends of the free lever shaft. In this manner, the forward and rearward thrust of the rotor may be controlled when the free lever shaft is proximally in the vertical position, and the upward and downward thrust of the rotor may be controlled when the free lever shaft is proximally in the horizontal position. The secondary wing 2708 is preferably a freewing because the wing will be freely pivotable about its spanwise axis to balance the vertically flowing air from the rotor with the horizontal airflows associated with the forward motion of the aircraft.

Likewise, the secondary ventral dynamic flight control surface imparts a force to its ventral mounting to the free lever shaft. Again, the free lever shaft's dynamic balance as a thrust vectored pendulum is displaced and the shaft is caused to seek a new equilibrium angle. In this manner, the lateral thrust of the rotor (roll axis of the aircraft) may be controlled when the free lever shaft is proximally in the vertical position, and the yaw thrust of the rotor (yaw axis of the aircraft) may be controlled when the free lever shaft is proximally in the horizontal position. Differential displacement of either or both of the lateral and ventral control surfaces imparts a rolling force to the aircraft. In this manner, the thrust of the rotor may be used to control the yaw axis of the aircraft when the free lever shaft is proximally in the vertical position, and the roll axis of the aircraft when the free lever shaft is proximally in the horizontal position.

The improved aircraft of the present invention solves a number of problems involved with the fundamental functional usage of aircraft, and has the following advantages over the art. First, the inventive aircraft is stable in all flight modes, whether in horizontal, vertical or any transition flight modes. Second, flight safety in the inventive aircraft is enhanced because the wing in the aircraft of the present invention does not stall. Third, the operational efficiency of the aircraft of the present invention is increased, especially during cruise flight, as the wing can be sized smaller to produce less drag and the rotor can be of a large size.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. For example, although the embodiment in the foregoing description uses a rotor as means for generating thrust, it is within the scope of the present invention to provide the improved aircraft with alternative means for generating thrust, e.g., a jet engine or jet engines. For another example, although the embodiment in the foregoing description uses a freewing as means for generating lift, it is within the scope of the present invention to provide the improved aircraft with alternative means for generating lift, e.g., a mechanically pivoting wing. For another example, a computer system could be utilized to determine that angularity of the free lever shaft which balances the thrust and drag forces and then move the lever to that angle mechanically. It is, therefore, intended that the protection granted hereon be limited only by the definition contained in the appended claims and equivalents thereof.

What is claimed is:

1. An aircraft, comprising:
   a fuselage;
   a lifting wing operatively connected to said fuselage;
   a boom having opposite distal and proximal end portions, the proximal end portion of said boom being pivotally supported on said fuselage;
   an engine; and
   a source of propulsion connected to the engine for generating a thrust at the distal end portion of said boom for propelling the aircraft;
   wherein said boom is freely pivotable about the proximal end to assume an angle of orientation that balances the thrust generated by said engine with the gravitational, lift and drag forces acting upon said aircraft; and
   wherein, in all flight modes, said freely pivoting boom is substantially in longitudinal alignment with the thrust line of said thrust generated by said source of propulsion.

2. The aircraft of claim 1, wherein said wing has an aerodynamic center and is pivotably mounted to said fuselage about a spanwise axis forward of said aerodynamic center.

3. The aircraft of claim 2, wherein said wing is one of a freewing and a mechanically pivoting wing.

4. The aircraft of claim 1, wherein said boom is a free lever that is freely pivotable about the proximal end portion to assume the angle of orientation that balances the thrust generated by said engine with the gravitational, lift and drag forces acting upon said aircraft.

5. The aircraft of claim 1, further comprising means for vectoring said thrust.

6. The aircraft of claim 1, wherein said wing has an aerodynamic center, said aircraft has a center of mass, and the aerodynamic center of said wing is located at or above the center of mass of said aircraft.

7. The aircraft of claim 6, wherein the proximal end portion of said boom is disposed between the aerodynamic center of said wing and the center of mass of said aircraft.

8. The aircraft of claim 1, wherein the proximal end portion of said boom is operatively coupled to said engine to transmit an engine output to the distal end portion of said boom, said aircraft further comprising a coupling pivotably connecting the proximal end of said boom to said engine.

9. The aircraft of claim 1, wherein said source of propulsion comprises a rotor connected to the distal end portion of said boom, said rotor being driven by said engine to produce said thrust.

10. An aircraft, comprising:
    a fuselage;
    a lifting wing operatively connected to said fuselage;
    a boom having opposite distal and proximal end portions, the proximal end portion of said boom being pivotally supported on said fuselage;
    an engine; and
    a source of propulsion connected to the engine for generating a thrust at the distal end portion of said boom for propelling the aircraft;
    wherein
    said boom is freely pivotable about the proximal end to assume an angle of orientation that balances the thrust generated by said engine with the gravitational, lift and drag forces acting upon said aircraft;
    said source of propulsion comprises a rotor connected to the distal end portion of said boom, said rotor being driven by said engine to produce said thrust; and
    said boom comprises a rotating shaft for rotating said rotor.

11. The aircraft of claim 1, wherein said boom is pivotable at least 90 degrees in a forward direction between a substantially vertical orientation and a substantially horizontal orientation.

12. The aircraft of claim 6, wherein, in vertical flight, the center of thrust located on the distal end portion of said boom is disposed above the center of mass of the aircraft when said boom is oriented vertically upward.

13. The aircraft of claim 6, wherein, in horizontal flight, the center of thrust located on the distal end portion of said boom is disposed forward of the center of drag of said aircraft when said boom is oriented horizontally forward.

14. The aircraft of claim 1, wherein
    said fuselage has a gravitational force and exerts a drag force upon airflow about said fuselage,
    said wing exerts lift and drag forces upon airflow about said wing, and
    said boom pivots to create a dynamic equilibrium between the horizontal and vertical components of said thrust, said lift and drag forces of said wing, and said gravitational and drag forces of said fuselage.

15. The aircraft of claim 14, further comprising a thrust director for vectoring and modifying said thrust for changing the dynamic equilibrium of said aircraft.

16. The aircraft of claim 7, wherein a rotational axis of the proximal end portion of said boom, the aerodynamic center of said wing and the center of mass of said aircraft are substantially aligned vertically in all flight modes.

17. The aircraft of claim 1, wherein said engine comprises a jet engine installed at the distal end portion of said boom.

18. An aircraft, comprising:
    a fuselage;
    a lifting wine operatively connected to said fuselage;
    a boom having opposite distal and proximal end portions, the proximal end portion of said boom being pivotally supported on said fuselage;
    an engine; and
    a source of propulsion connected to the engine for generating a thrust at the distal end portion of said boom for propelling the aircraft;
    wherein said boom is freely pivotable about the proximal end to assume an angle of orientation that balances the thrust generated by said engine with the gravitational, lift and drag forces acting upon said aircraft;
    said aircraft further comprising at least one dynamic flight control surface on said boom, said dynamic flight control surface being controllably reoriented by a pilot or aircraft control to vector the thrust, said boom being free to pivot to assume a new angle of orientation that balances the thrust generated by said engine with the gravitational, lift and drag forces acting upon said aircraft.

19. The aircraft of claim 18, further comprising a secondary wing mounted on said boom wherein said dynamic flight control surface is part of said secondary wing.

20. The aircraft of claim 19, wherein said secondary wing is a free wing.

21. The aircraft of claim 18, wherein said at least one dynamic flight control surface comprises lateral and ventral dynamic flight control surfaces.

22. A method of controlling an aircraft in horizontal flight, vertical flight or any transition flight mode between the horizontal and vertical flight, said method comprising the steps of:

generating a thrust, sufficient to lift the aircraft either directly or through a lifting wing, at a distal end portion of a boom pivotally supported at a proximal end portion thereof by a fuselage of the aircraft;

vectoring the thrust toward a desired flight direction; and permitting the boom to freely pivot to assume an angle of orientation that balances the vectored thrust with the gravitational, lift and drag forces acting upon the aircraft, wherein said boom assumes a substantially horizontal orientation in the horizontal flight.

23. The method of claim 22, wherein said pivoting comprises pivoting the boom about a rotational axis that is located at or above the center of mass of the aircraft.

24. The method of claim 22, wherein said vectoring comprises modifying the horizontal component of the thrust to give the aircraft a predetermined airspeed at which a wing of the aircraft provides a lift, at or above the center of mass of the aircraft, that is equal to the weight of the aircraft.

25. The method of claim 22, comprising allowing the boom to freely pivot about the proximal end portion between the horizontal orientation in the horizontal flight and a substantially vertical orientation in the vertical flight.

26. The method of claim 25, wherein the thrust is vectored to establish a different resultant angle which the boom freely assumes, as a result of said pivoting, to balance the forces acting on the aircraft as a result of the vectored thrust acting on the distal end portion.

27. The method of claim 22, further comprising allowing a freewing of the aircraft to freely pivot for producing a lift and drag upon airflow about the wing in response to said thrust vectoring.

28. The method of claim 27, further comprising positioning a center of lift of said wing at or above the center of mass of the aircraft.

29. The method of claim 22, further comprising forcibly pivoting a wing of the aircraft about a spanwise axis for producing a lift and drag upon airflow about the wing in response to said thrust vectoring, said wing having a center of lift at or above the center of mass of the aircraft.

30. The method of claim 22, wherein said pivoting is automatically performed without pilot intervention.

31. A method for the control of an aircraft in horizontal or vertical flight and all transition modes thereof, said method comprising the steps of:

generating sufficient thrust to lift the aircraft using a thrust source;

vectoring said thrust to achieve one of said horizontal, vertical and transition flight modes;

said thrust being located on an armature or boom having a distal and proximal end and which boom is freely pivotable longitudinally during flight operations about the proximal end;

said thrust being located toward the distal end of said boom such that, in the vertical flight, the thrust is above the center of mass of the aircraft, the boom is pivoted vertically and the thrust line from said thrust is directed vertically downward such that the aircraft operates as a thrust vectored gravity pendulum; and said thrust being located toward the distal end of said boom such that, in the horizontal flight, the thrust is forward of the center of drag of the aircraft, the boom is pivoted horizontally and the thrust line from said thrust is directed horizontally rearward such that the aircraft operates as a thrust vectored drag pendulum.

32. The method of claim 31, wherein the proximal end of the boom is located at or above the center of mass of the aircraft and wherein a wing provides lift at or above the center of mass of the aircraft and wherein at some determined airspeed the lift of the wing is equal to the weight of the aircraft.

33. The method of claim 32, wherein the boom is freely pivotable about the proximal end between a predominately vertical and a predominately horizontal orientation, said boom being freely able to assume an angle which balances the lift and drag forces of the aircraft and the wing such that the aircraft operates as a thrust vectored gravity pendulum in vertical flight or as a thrust vectored drag pendulum in horizontal flight, any angle which the boom freely assumes between vertical or horizontal being that angle which balances the forces acting on the gravity pendulum and those forces acting upon the drag pendulum.

34. The method of claim 33, wherein the thrust is vectored to establish a different resultant angle which the boom freely assumes to balance the forces acting on the gravity pendulum and those forces acting upon the drag pendulum.

35. The method of claim 33, wherein the wing which is employed is a freewing pivotably supported by said fuselage for producing a lift and drag upon airflow about the free wing.

36. The method of claim 33, wherein the wing which is employed is a freewing whose center of lift is at or above the center of lift of the center of mass of the aircraft.

37. The method of claim 33, wherein the wing which is employed is a pivoting wing whose center of lift is at or above the center of lift of the center of mass of the aircraft.

38. The method of claim 31, comprising vectoring said thrust to achieve said horizontal flight.

39. The method of claim 38, wherein the proximal end of the boom is located at or above the center of mass of the aircraft and wherein a wing provides lift at or above the center of mass of the aircraft and wherein at some determined airspeed the lift of the wing is equal to the weight of the aircraft.

40. The method of claim 38, wherein the boom is freely pivotable about the proximal end between a predominately vertical and a predominately horizontal orientation, said boom being freely able to assume an angle which balances the forces acting on the gravity pendulum and those forces acting upon the drag pendulum.

41. The method of claim 38, wherein the thrust is vectored to establish a different resultant angle which the boom freely assumes to balance the forces acting on the gravity pendulum and those forces acting upon the drag pendulum.

42. The method of claim 38, further comprising providing said aircraft with a freewing pivotably supported by said fuselage for producing a lift and drag upon airflow about the free wing.

43. The method of claim 42, wherein the freewing has a center of lift at or above the center of mass of the aircraft.

44. The method of claim 38, further comprising providing said aircraft with a pivoting wing whose center of lift is at or above the center of mass of the aircraft for producing a lift and drag upon airflow about the pivoting wing.

45. The aircraft of claim 1, wherein said boom is freely pivotable about the proximal end in flight between a substantially vertical orientation and a substantially horizontal orientation.

46. The aircraft of claim 10, wherein said rotor is a counter rotating rotor.

47. An aircraft, comprising:

a fuselage;

a lifting wing operatively connected to said fuselage;

a boom having opposite distal and proximal end portions, the proximal end portion of said boom being pivotally supported on said fuselage;

an engine; and a source of propulsion connected to the engine for generating a thrust at the distal end portion of said boom for propelling the aircraft;

wherein said boom is freely pivotable about the proximal end to assume an angle of orientation that balances the thrust generated by said engine with the gravitational, lift and drag forces acting upon said aircraft, thereby creating a dynamic equilibrium between the thrust and the gravitational, lift and drag forces; and wherein, at all dynamic equilibriums between the thrust and the gravitational, lift and drag forces, said freely pivoting boom is in longitudinal alignment with the thrust line of said thrust generated by said source of propulsion.

* * * * *